US009235335B2

(12) United States Patent
Morrill et al.

(10) Patent No.: US 9,235,335 B2
(45) Date of Patent: Jan. 12, 2016

(54) TOUCH INTERACTIONS WITH A DRAWING APPLICATION

(75) Inventors: Jason Frank Morrill, Bellevue, WA (US); Jie Li, Bellevue, WA (US); L. Tucker Hatfield, Bothell, WA (US); Andrew Grey Carlson, Redmond, WA (US); Brian T. Hill, Duvall, WA (US); Shayne Martin Holmes, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 191 days.

(21) Appl. No.: 13/531,960

(22) Filed: Jun. 25, 2012

(65) Prior Publication Data

US 2013/0346924 A1 Dec. 26, 2013

(51) Int. Cl.
*G06F 17/10* (2006.01)
*G06F 3/0484* (2013.01)
*G06F 3/0485* (2013.01)
*G06F 3/0488* (2013.01)

(52) U.S. Cl.
CPC .......... *G06F 3/04842* (2013.01); *G06F 3/0485* (2013.01); *G06F 3/04845* (2013.01); *G06F 3/04883* (2013.01); *G06F 3/0488* (2013.01); *G06F 2203/04806* (2013.01); *G06F 2203/04808* (2013.01)

(58) Field of Classification Search
CPC ................. G06F 2203/04808; G06F 3/04883; G06F 3/0488
USPC .................... 715/769, 835, 810, 800; 324/173
See application file for complete search history.

(56) References Cited

U.S. PATENT DOCUMENTS

| 5,666,499 A * | 9/1997 | Baudel ................. G06F 3/0481 345/157 |
| 7,956,847 B2 * | 6/2011 | Christie ................. G06F 3/044 345/173 |
| 2005/0259086 A1 | 11/2005 | Chiu et al. |

(Continued)

OTHER PUBLICATIONS

Sun, et al., "Enhancing Naturalness of Pen-and-Tablet Drawing through Context Sensing", Nov. 13-16, 2011, Retrieved at <<http://research.microsoft.com/en-us/people/xiangc/its2011_pentabletcontext.pdf>>, Proceedings of the ACM Int'l Conf. on Interactive Tabletops and Surfaces, pp. 83-86.

(Continued)

*Primary Examiner* — Boris Pesin
*Assistant Examiner* — Justin Lee
(74) *Attorney, Agent, or Firm* — Steve Crocker; Danielle Johnston-Holmes; Micky Minhas

(57) ABSTRACT

Concepts and technologies are described herein for touch interactions with a drawing application. In accordance with the concepts and technologies disclosed herein, user devices can obtain drawing data generated by a web-based drawing application and can display a drawing by rendering the data in one or more UIs. The user device can interpret touch gestures at a touch sensitive display used to present the UIs and can interpret the touch gestures as corresponding to one or more commands for modifying the UIs. According to various embodiments, the user device can interpret the touch gestures by determining if the touch gestures intersect an object in the drawing and other behavior associated with the touch gesture such as movement, subsequent touches, and whether or not an object intersected was selected when the touch gesture was commenced.

18 Claims, 23 Drawing Sheets

(56) References Cited

U.S. PATENT DOCUMENTS

| | | |
|---|---|---|
| 2009/0040226 A1 | 2/2009 | Qiu |
| 2009/0164595 A1 | 6/2009 | Shiigi |
| 2009/0199123 A1* | 8/2009 | Albertson .......... G06F 3/04845 715/772 |
| 2010/0211920 A1* | 8/2010 | Westerman et al. .......... 715/863 |
| 2010/0309140 A1* | 12/2010 | Widgor .............. G06F 3/04883 345/173 |
| 2010/0309148 A1 | 12/2010 | Fleizach et al. |
| 2011/0010676 A1 | 1/2011 | Khosravy et al. |
| 2011/0069018 A1* | 3/2011 | Atkins ................. G06F 3/0416 345/173 |
| 2012/0081389 A1* | 4/2012 | Dilts ................. G06F 3/04812 345/619 |
| 2012/0127206 A1* | 5/2012 | Thompson .............. G06F 3/038 345/661 |
| 2013/0111380 A1* | 5/2013 | Parker ................. G06F 3/04845 715/765 |
| 2013/0222265 A1* | 8/2013 | Smith ................. G06F 3/04883 345/173 |

OTHER PUBLICATIONS

Chivers, et al., "Gesture-Based Input for Drawing Schematics on a Mobile Device", Jul. 15, 2011, Retrieved at <<http://www.cs.kent.ac.uk/pubs/2011/3150/content.pdf>>, 15th International Conference on Information Visualisation (IV), 2011, pp. 127-134.

Ginsbury, Suzanne., "Are Touchscreen Tablets Effective Design Tools?",Mar. 18, 2011, Retrieved at <<http://www.smashingmagazine.com/2011/03/18/are-touchscreen-tablets-effective-design-tools-review/>>, Retrieved Date Mar. 19, 2012, pp. 5.

Furnas, et al., "MuSE: A Multiscale Editor", Nov. 1-4, 1998, Retrieved at <<http://citeseerx.ist.psu.edu/viewdoc/download-?doi=10.1.1.110.8923&rep=rep1&type=pdf>>, 11th Annual ACM Symposium on User Interface Software and Technology (UIST98), pp. 107-116.

* cited by examiner

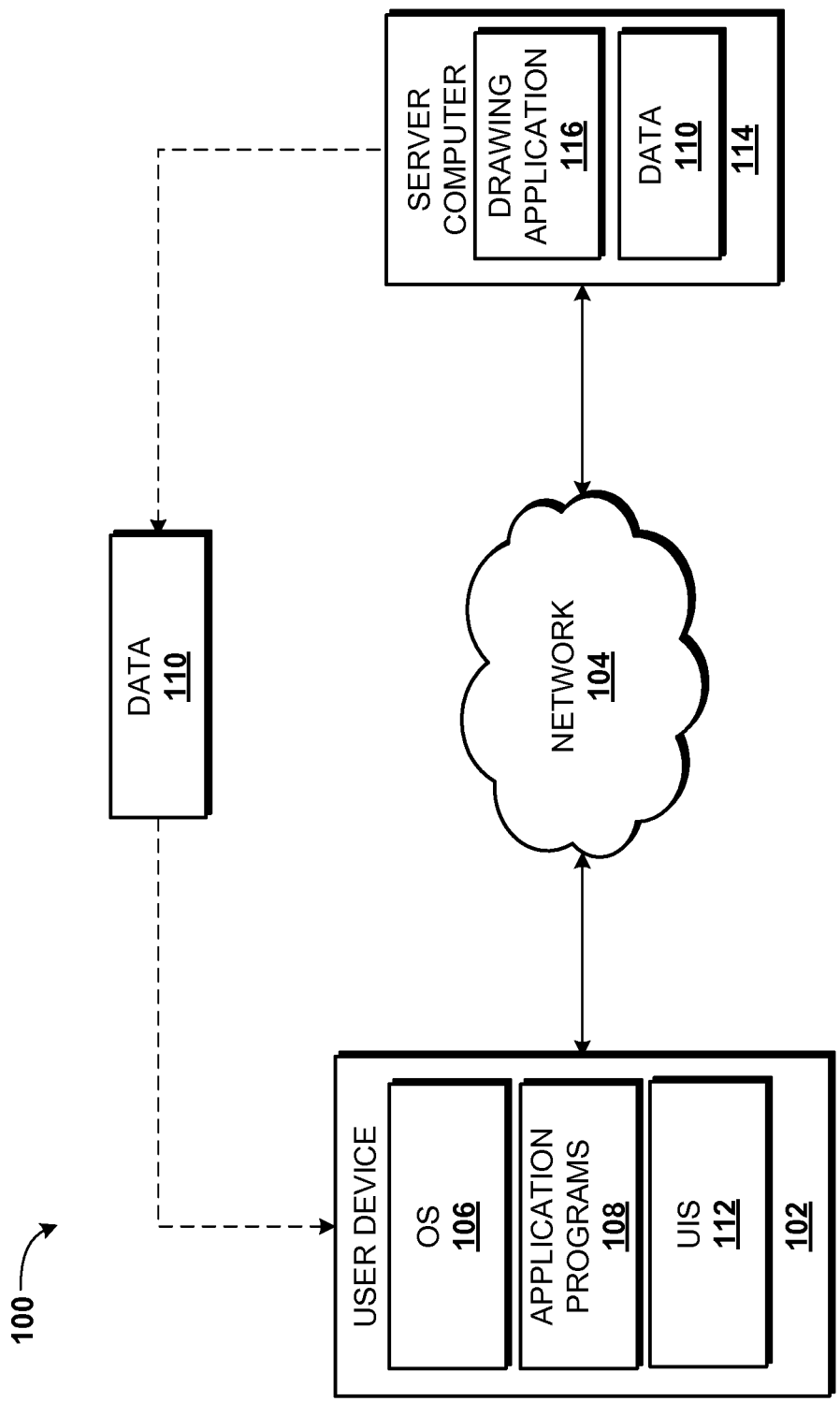

TOUCH INTERACTIONS WITH A DRAWING APPLICATION

BACKGROUND

Drawing applications are sometimes used by businesses and consumers to generate drawings and diagrams for various purposes. For example, drawing applications may be used to generate flowcharts, organization charts, block diagrams, or the like for various business purposes. Drawing applications also can be used to generate complex drawings such as architectural drawings, three-dimensional objects, layouts, or the like.

In many instances, users rely upon natively executed drawing programs to create drawings. Users may upload the generated drawings to collaboration sites or share the drawings with other entities via email, websites, or the like. Because drawings applications often require extensive computing power, however, users generally are unable to create drawings at remote locations. Instead, users often take photographs or sketches of these remote locations and return to a home or business to generate the drawings using the natively executed drawing programs.

While web-based drawing programs are available, these drawing programs often provide only rudimentary functionality. Additionally, these drawing programs may be difficult to interact with mobile devices. In particular, users may be required to type commands or use cursors to place and/or move objects within drawings, and users may be unable to interact with drawings using touch interfaces, as such devices may or may not be supported.

It is with respect to these and other considerations that the disclosure made herein is presented.

SUMMARY

Concepts and technologies are described herein for touch interactions with a drawing application. In accordance with the concepts and technologies disclosed herein, users can access a drawing application to create, modify, and/or save drawings. According to various implementations, the drawing application can include a natively executed application. In some other implementations, the drawing application can include a web application executed by a server computer and can save the drawing file as markup language data such as hypertext markup language ("HTML"), extensible markup language ("XML"), and/or various scripts, snippets, and/or other executable code. The drawing file can be saved as data that is hosted and/or served by the server computer to a user device such as a slate, smart phone, or other device that can be configured to access the server computer via a communications network such as the Internet, an intranet, or other networks.

The user device can render the data in one or more user interfaces ("UIs") for display at the user device. In various implementations, the UIs are presented in a touch sensitive display device by an application program such as a web browser, a natively executed mobile application, or a natively executed drawing application that can be used to create, view, modify, and/or save drawings at the user device. The user device can detect touch events occurring at the user device and can interpret the touch events as touch gestures. In particular, the user device can interpret the touch events by determining if the touch gestures intersect a shape or other object in the drawing, and analyze behavior associated with the touch gesture subsequent to the initially registered touch event.

According to one aspect, the user device determines if a touch gesture intersects an object. If the touch gesture does not intersect an object, the user device can determine if any movement is detected. If not movement is detected, the user device can determine if the touch corresponds to a menu option or other UI control for creating a shape, or the like, such as a contact in a shapes toolbar. If not, the touch gesture can correspond to a de-select command to clear selections within the drawing and/or can be disregarded, if desired. If the movement is detected, the user device can determine if the touch gesture corresponds to a pan gesture or a pinch gesture, and can apply the appropriate command to the UI in response to this determination.

According to another aspect, if the touch gesture intersects an object, the user device can analyze the touch gesture to interpret a command intended by the gesture. If the touch gesture is released, for example if the touch gesture corresponds to a tap gesture, the user device can determine if the intersected shape was previously selected. If so, the and if there is no movement, the user device can launch a text editing mode or text edit mode. If movement is detected, the user device can apply a move command to move the touched object to a new location within the UI. If the object previously was not selected, the user device can select the object.

If the touch gesture is not released, the user device can determine if a subsequent touch is detected prior to release of the touch gesture. If a subsequent touch is detected, the user device can determine if the touch corresponds to a touch-right-click gesture, a gesture in which a first finger is brought into contact with a display and a second finger is brought into contact with the display proximate to the first finger. If the touch-right-click gesture is detected, or if no subsequent touch is detected and instead the first contact is held stationary, the user device can display a contextual UI associated with intersected object. If the subsequent touch does not correspond to touch-right-click gesture, the user device can invoke other commands, as will be explained in more detail herein.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1 is a system diagram illustrating an illustrative operating environment for the various embodiments disclosed herein.

DETAILED DESCRIPTION

Figure 2A:
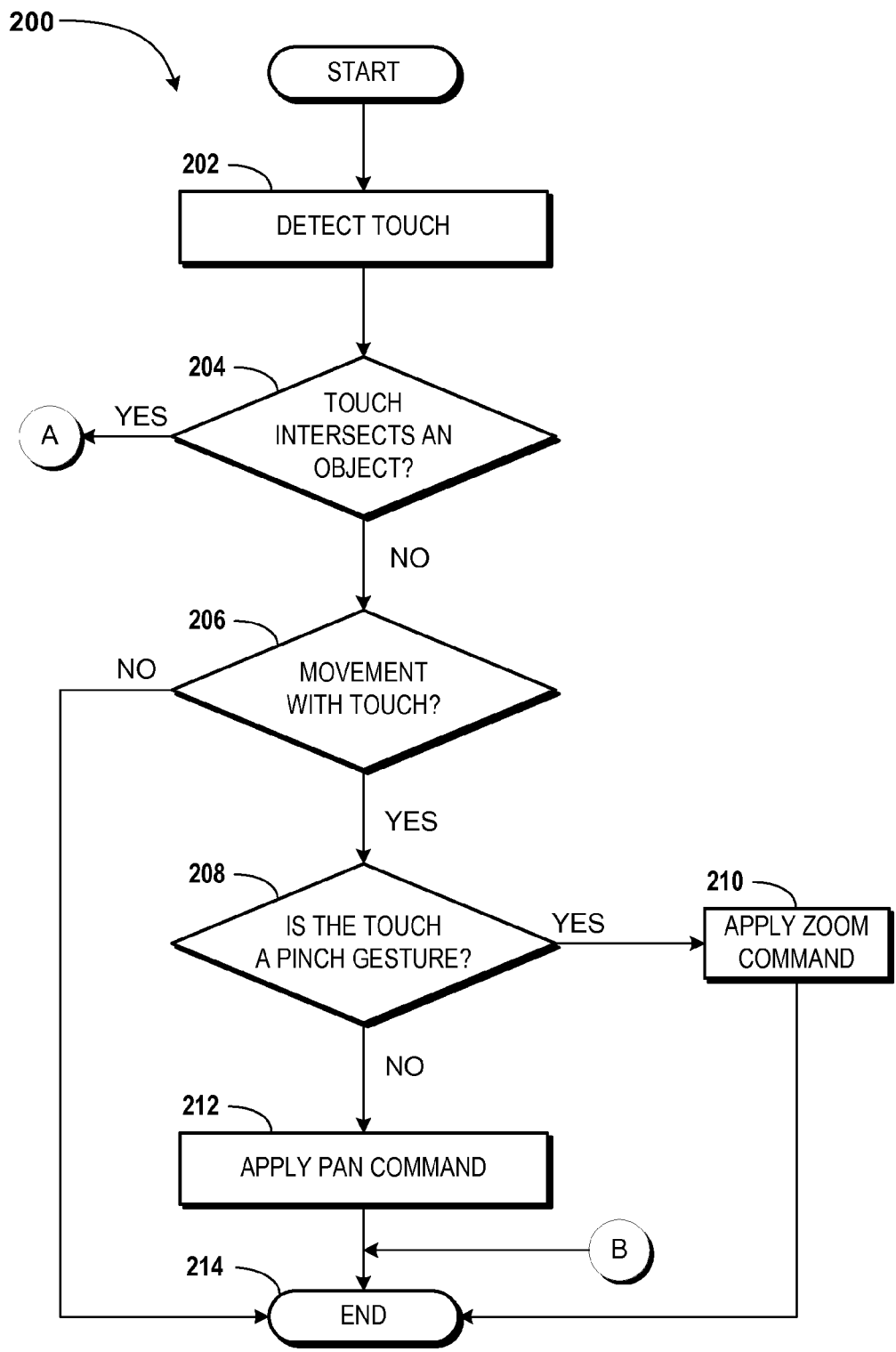
FIGS. 2A-2B are flow diagrams showing aspects of a method for supporting touch interactions with a drawing application, according to an illustrative embodiment.

The following detailed description is directed to concepts and technologies for touch interactions with a drawing application. According to the concepts and technologies described herein, users can access a web-based drawing application or a natively executed drawing application to create, modify, and/or save drawings as drawing files. The drawing files can be saved in HTML, XML, and/or other languages and/or scripts, snippets, and/or other executable code such as JAVASCRIPT, .asp, or the like. The drawing file can be accessed by various user devices such as slates, tablets, smart phones, or the like.

The user device can render the data in one or more UIs for display at the user device in a touch sensitive display device. In some embodiments, the user device executes an application program such as a web browser to render the data in the UIs, and in other embodiments, the user device can be configured to execute a natively executed drawing application to provide the functionality described herein. As such, while some embodiments of the concepts and technologies disclosed herein are described a using a web browser or the like to interact with a web-based drawing application, it should be understood that that the concepts and technologies disclosed herein for touch interactions with drawing applications can be used to interact with a natively executed drawing application that is executed on a device that includes a touch interface. The user device can detect touch events occurring at the touch sensitive display and can interpret the touch events as touch gestures. In particular, the user device can interpret the touch events by determining if the touch gestures intersect a shape or other object in the drawing, and analyze behavior associated with the touch gesture subsequent to the initially registered touch event. According to various embodiments, the user device can analyze movement, subsequent touches, and whether or not an object intersected was selected when the touch gesture was commenced to interpret the touch gesture.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for touch interactions with a drawing application will be presented.

Referring now to FIG. 1, aspects of one operating environment 100 for the various embodiments presented herein will be described. The operating environment 100 shown in FIG. 1 includes a user device 102. According to various embodiments, the functionality of the user device 102 can be provided by a personal computer ("PC") such as a desktop, tablet, or laptop computer system. In some other embodiments, the functionality of the user device 102 can be provided by other types of computing systems including, but not limited to, a handheld computer, a netbook computer, an embedded computer system, a personal digital assistant ("PDA"), a mobile telephone, a smart phone, or another computing device.

Various embodiments of the user device 102 are illustrated and described below, particularly with reference to FIGS. 4-6. According to various embodiments of the concepts and technologies disclosed herein for supporting touch interactions with a drawing application, the functionality of the user device 102 is described as being provided by a tablet or slate computing device, a smartphone, or a PC having a touch-sensitive display. Because the functionality described herein with respect to the user device 102 can be provided by additional and/or alternative devices, it should be understood that these embodiments are illustrative, and should not be construed as being limiting in any way.

The user device 102 can be configured to execute an operating system 106 and one or more application programs 108. The operating system 106 is a computer program for controlling the operation of the user device 102. The application programs 108 are executable programs configured to execute on top of the operating system 106 to provide various functionality. According to various implementations, the application programs 108 include, but are not limited to, web browsing programs ("web browsers"), multimedia software, native web-based applications, drawing programs, other applications, or the like. The application programs 108 can be configured to receive or store data 110, to execute various operations with respect to the data 110, and to render various views of the data 110 in one or UIs 112. The UIs 112 can be presented at the user device 102 and/or at other devices.

According to various implementations of the concepts and technologies disclosed herein, the data 110 can correspond to drawing files or drawing data in various formats. In some embodiments, the data 110 can be obtained from a data source such as a database, a datastore, a network storage device, or another data storage device such as a server computer 114 that is operating as part of, or in communication with, the network 104. Because the data 110 can be obtained from almost any source, it should be understood that the illustrated embodiment in which the data 110 is obtained from the server computer 114 is illustrative and should not be construed as being limiting in any way.

The server computer 114 can be configured to execute a drawing application 116 and can be configured to host and/or serve the data 110 to the user device 102 and/or other devices, nodes, and/or networks. According to various embodiments, the data 110 corresponds to a drawing file generated by the drawing application 116. The data 110 can be formatted by the drawing application 116 such that the data 110 can be viewed or modified by a member of the MICROSOFT VISIO family of drawing programs from Microsoft Corporation in Redmond, Wash. Thus, the data 110 can include a file in the .vsd format or other drawing format, if desired.

In some other embodiments, the drawing application 116 corresponds to a web-based drawing application such as a member of the VISIO WEB APPLICATION family of drawing software from Microsoft Corporation in Redmond, Wash. Thus, drawings created using the drawing application 116 can be saved as the data 110, wherein the data 110 can correspond to an HTML file, an XML file, and/or other types of files. The data 110 therefore can include various scripts or snippets such as, for example, JAVASCRIPT, .ASP, and/or other web-based file formats or executable code that, when executed and/or rendered by the application programs 108, represents a drawing. As such, in various implementations of the concepts and technologies disclosed herein, the files represented by the data 110 can include, but are not limited to, files in web-based formats for representing drawings or other types of files. Because the data 110 can include data in the above-described, as well as other formats, it should be understood that this embodiment is illustrative, and should not be construed as being limiting in any way.

The UIs 112 can include, in various embodiments, computer-executable code that, when executed by the user device 102, causes the user device 102 to present a user interface for viewing the data 110, for supporting interactions by users or other entities with the data 110, for allowing users or other entities to interact with the application programs 108 executed by the user device 102, and/or to support viewing and/or otherwise interacting with the data 110. Various embodiments of some illustrative UIs 112 are illustrated and described below, particularly with reference to FIGS. 3A-3Q. Briefly, the UIs 112 can include various application-specific and/or device-specific menus, soft buttons, command ribbons, icons, and/or other types of controls for controlling the application programs 108, for interacting with the data 110, and/or for interacting with or controlling other applications or resources associated with and/or accessed by the user device 102.

According to various embodiments disclosed herein, the user device 102 can be configured to access or receive the data 110 corresponding to a drawing, diagram, flowchart, or other file. The user device 102 can obtain the data 110 from the server computer 114 and store the data 110 at the user device 102 in a memory, a cache, a hard drive, and/or in any other data storage component. The user device 102 also can be configured to display the data 110 in a user interface or screen display such as the UIs 112. According to various embodiments, the UIs 112 are presented on a touch-sensitive and/or multi-touch-sensitive display device associated with the user device 102.

According to various embodiments of the concepts and technologies disclosed herein, the user device 102 can be configured to detect touch events detected at the user device 102, to interpret the touch events as corresponding to one or more commands, and to implement the commands to modify the UIs 112. According to some implementations, the user device 102 can determine if the touch event detected at the user device 102 intersects an object displayed on the display device. As such, the user device 102 can determine if the touch gesture is intended by the user to apply to the workspace in which objects are displayed, or to a particular object. In some embodiments, the user device 102 determines if an object is intersected based upon determining if any portion of a contact area intersects the object and in other embodiments, the user device determines if a center point of the contact area intersects the object. In yet other embodiments, the user device 102 can determine that the contact area intersects the object based upon weighting and probability analysis, even if the contact area does not actually intersect the object.

Based upon determining if the contact area intersects the object or not, the user device 102 can interpret the detected touch. If the touch does not intersect an object, the user device 102 can determine if any movement is associated with the touch and if so, can determine if the command corresponds to a pinch gesture or another gesture such as a gesture for invoking a pan command. The user device also can detect a shape creation command, which is illustrated and described in more detail below.

If the touch intersects an object, the user device 102 can determine if the touch has been released and if subsequent touches have been detected. In some embodiments, subsequent touches can be interpreted as specific gestures and therefore can be analyzed by the user device. The user device 102 also can determine if an object with which the touch intersected was selected prior to the touch. Based upon these and other determinations and analyses, the user device 102 can interpret the touch and invoke various commands. Some of the various gestures and commands that can be used to interact with a drawing application are illustrated and described in more detail below, particularly with reference to FIGS. 2A-3Q.

FIG. 1 illustrates one user device 102, one network 104, and one server computer 114. It should be understood, however, that some implementations of the operating environment 100 include multiple user devices 102, multiple networks 104, and/or multiple server computers 114. Thus, the illustrated embodiment should be understood as being illustrative, and should not be construed as being limiting in any way.

Figure 2B:
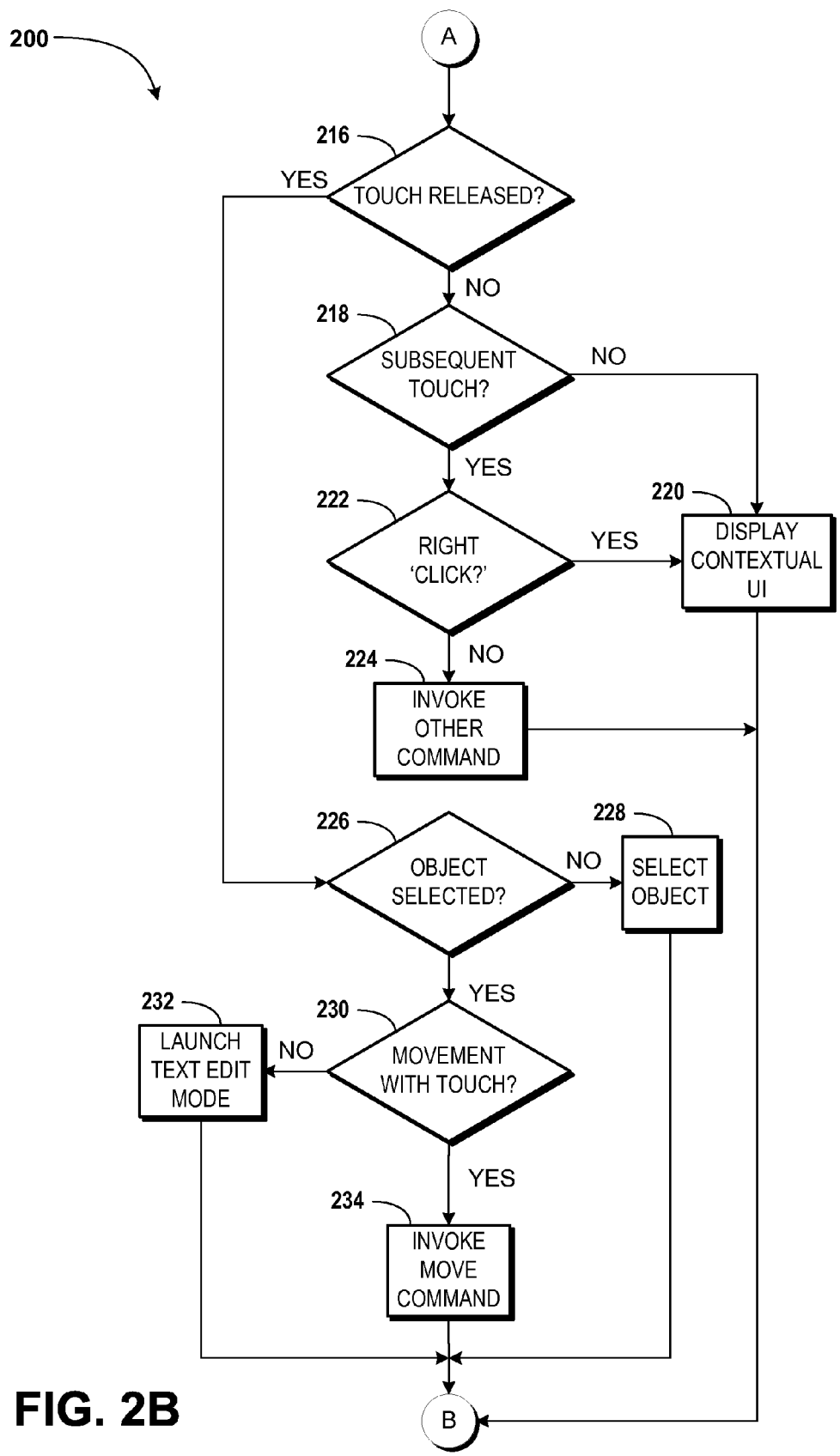

Turning now to FIGS. 2A-2B, aspects of a method 200 for supporting touch interactions with a drawing application will be described in detail. It should be understood that the operations of the method 200 disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated method 200 can be ended at any time and need not be performed in its entirety. Some or all operations of the method 200, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the method 200 disclosed herein is described as being performed by the user device 102 via execution of computer executable instructions such as, for example, the application programs 108. It should be understood that devices other than, or in addition to, the user device 102 can be configured to provide the functionality described herein via execution of various application program, modules, and/or other computer executable instructions in addition to, or instead of, the application programs 108. As such, it should be understood that the described embodiment is illustrative, and should not be construed as being limiting in any way.

The method 200 begins at operation 202, wherein the user device 102 detects a touch. It should be understood that prior to the method 200 beginning, the user device 102 can obtain the data 110 and render the data 110 at a display device associated with the user device 102. As such, the method 200 can begin with a user or other entity interacting with the displayed data 110 via a touch command or gesture at a display device used to display one or more of the UIs 112.

In some embodiments, the user device 102 can execute a touch event handler configured to detect, register, track, and interpret touch events. Thus, the user device 102 can be configured to interpret touch events as various gestures including, but not limited to, tap gestures, tap-and-hold gestures, pinch gestures, double tap gestures, touch-right-click gestures, or the like, which are described and illustrated in more detail below, particular with reference to FIGS. 3A-3Q.

From operation 202, the method 200 proceeds to operation 204, wherein the user device 102 determines if the touch detected in operation 202 intersects an object. In particular, the user device 102 can determine if a touch event detected in operation 202 is made at a point of the display screen that displays at least a portion of a displayed object such as text, a shape, or the like. Because the user device 102 can be configured to generate the rendered UIs 112, the user device 102 can determine if the touch event occurs at or near the object by comparing a location of the touch event to locations of displayed objects. Because the user device 102 can determine if the touch events intersect objects in other ways, it should be understood that these embodiments are illustrative, and should not be construed as being limiting in any way.

If the user device 102 determines, in operation 204, that the touch event intersects an object, the method 200 proceeds to the functionality illustrated and described below with reference to FIG. 2B. If the user device 102 determines, in operation 204, that the touch event does not intersect an object, the method 200 proceeds to operation 206.

In operation 206, the user device 102 determines if any movement is detected with respect to the touch detected in operation 202. Thus, for example, the user device 102 can determine if a tough-drag gesture is detected. A "touch-drag" gesture, also referred to herein as a "touch-and-drag" gesture, can include a touch at a contact point of an input device such as a touch-sensitive screen and movement of the finger, stylus, or other structure ("finger") used to make the gesture while the finger is left in contact with the input device. Thus, in operation 206, the user device 102 can be configured to determine if the finger associated with the touch detected in operation 202 has moved. Other gestures that may include movement include, but are not limited to, a pinch gesture, a two-fingered pan gesture, a pan gesture, or the like.

If the user device 102 determines, in operation 206, that no movement is associated with the touch, user device 102 can determine that the touch was a stray touch or otherwise was not associated with a command. Thus, the method 200 can end. If the user device 102 determines, in operation 206, that movement is associated with the touch, the method 200 can proceed to operation 208.

In operation 208, the user device 102 determines if the touch and movement detected in operations 202 and 206 corresponds to a pinch gesture. In some embodiments of the concepts and technologies disclosed herein, pinch gestures, even if made at a location that intersects with an object, can be treated in the same way. For simplicity, however, FIGS. 2A-2B illustrate a determination of whether a gesture corresponds to a pinch gesture as occurring after determining that the gesture is not make at a location that intersects an object. In light of the above description, it should be understood that that this embodiment is illustrative and should not be construed as being limiting in any way.

The user device 102 can determine that the touch and movement correspond to a pinch gesture by analyzing the touch detected in operation 202 and the movement detected in operation 206. The user device 102 can identify a gesture as a pinch gesture by finding two contact points that move toward each other and/or where one of the contact points is moved toward the other. Because pinch gestures can be identified in other ways, it should be understood that this embodiment is illustrative, and should not be construed as being limiting in any way.

If the user device 102 determines, in operation 208, that the touch and movement correspond to a pinch gesture, the method 200 can proceed to operation 210. In operation 210, the user device 102 can apply a zoom command. According to various implementations, the zoom can be applied in at least two ways, namely, a zoom in and/or a zoom out. In some embodiments, the user device 102 can be configured to zoom out the display if a distance between multiple contact points is decreased during the detected movement. Similarly, the user device 102 can be configured to zoom in the display if a distance between multiple contact points is increased during the detected movement. Because the zooming in or out can be performed in response to other types of movements, it should be understood that these embodiments are illustrative, and should not be construed as being limiting in any way.

If the user device 102 determines, in operation 208, that the touch and movement do not correspond to a pinch gesture, the method 200 can proceed to operation 212. In operation 212, the user device 102 can apply a command such as a pan command. Because other commands can be applied instead of, or in addition to, the pan command, it should be understood that this embodiment is illustrative, and should not be construed as being limiting in any way. In some embodiments, the user device 102 can determine if a pan gesture is detected, though this is not illustrated in FIG. 2A. A pan gesture can be defined as a touch, then a drag, then a release of a finger, stylus, or other input object. Thus, the pan command described herein is illustrative and should not be construed as being limiting in any way. During the pan command, the display space such as a canvas or work space can be panned in a direction and an amount that correspond, respectively, to a direction and magnitude of a movement path of the finger or other structure while in contact with the display. In some embodiments, the panning is applied in a 1:1 ratio, relative to the movement, and in other embodiments, the panning is applied in other ratios.

From operations 210 and 212, the method 200 proceeds to operation 214. Additionally, the method 200 can proceed to operation 214 if the user device 102 determines, in operation 206, that no movement is associated with the touch detected in operation 202. The method 200 can end at operation 214. As mentioned above, however, the method 200 can proceed to FIG. 2B from operation 204 and as such, FIG. 2B will now be described in detail.

Turning now to FIG. 2B, various operations that can be executed to interpret touch events that intersect objects will be described in detail. In particular, the method 200 can proceed from operation 204 in FIG. 2A to operation 216 in FIG. 2B. In operation 216, the user device 102 can determine if the touch detected in operations 202 has been released. As such, the user device 102 can determine if the touch detected in operation 202 is continuing or if the touch has been released.

According to various embodiments, the user device 102 can determine that a touch has been released if the touch detected in operation 202 is released within a specified time period. The specified time period can be varied by user or application settings and/or user configurations. According to some embodiments, the specified time period includes a tenth of a second, a quarter of a second, a half of a second, three quarters of a second, a second, or other time periods. Because these time periods can be configurable, it should be understood that these embodiments are illustrative, and should not be construed as being limiting in any way.

If the user device 102 determines, in operation 216, that the touch detected in operation has not been released, the method 200 proceeds to operation 218. In operation 218, the user device 102 can determine if a subsequent touch has been detected at the user device 102. Thus, if the touch detected in operation 202 continues to be held by a user, the user device 102 can determine if the user has touched the screen or other input device with a second hand, a second finger, a second stylus, or other input mechanism or device in operation 218.

If the user device 102 determines, in operation 218, that a subsequent touch has not been detected, the method 200 proceeds to operation 220, wherein the user device can be configured to display a contextual menu or contextual user interface associate with the object. An example of a contextual user interface that can be displayed in operation 220 is illustrated and described below, particularly with reference to FIGS. 3H-3I. If the user device determines, in operation 218, that a subsequent touch has been detected, the method 200 proceeds to operation 222.

In operation 222, the user device 102 can determine if the subsequent touch detected in operation 218 corresponds to a right 'click.' In particular, various embodiments of the concepts and technologies disclosed herein provide commands for a touch-right-click gesture, which can correspond to a gesture in which a first finger is brought into contact with an input device, and a second finger is subsequently brought into contact with the input device. This gesture can be interpreted by the user device 102 as invoking functionality similar to that invoked by clicking a right mouse button, if desired. An example of a touch-right-click gesture is illustrated and described below with reference to FIG. 3H.

In operation 222, the user device 102 can determine, based upon an analysis of the subsequent touch and/or the location thereof, if the subsequent touch corresponds to a right 'click' as described above. If the user device 102 determines, in operation 222, that the subsequent touch corresponds to a right 'click,' the method 200 proceeds to operation 220, and the contextual menu or contextual user interface can be launched or displayed, as explained above. If the user device 102 determines, in operation 222, that the subsequent touch does not correspond to a right 'click,' the method 200 can proceed to operation 224.

In operation 224, an alternative command can be invoked. According to various embodiments, the second touch can correspond to the beginning of a pinch command, as explained above, to a second finger for a two finger drag command, to a pivot point for a rotate command, or other input. As such, the user device 102 can determine, in operation 224, what command is indicated, and can invoke that command. From operations 220 and 224, the method 200 can return to operation 214 of FIG. 2A, wherein the method 200 can end.

Returning now to operation 216, if the user device 102 determines, in operation 216, that the touch has been released, the method 200 can proceed to operation 226. In operation 226, the user device 102 can determine if the object on which the touch was detected in operation 202 and 204 was previously selected. In other words, the user device 102 can determine if the object was selected when the touch was detected in operation 202.

If the user device 102 determines, in operation 226, that the object was not selected, the user device 102 can select the object, as shown in operation 228. From operation 228, the method 200 can return to operation 214 of FIG. 2A, wherein the method 200 can end. If the user device 102 determines, in operation 226, that the object was selected, the method 200 proceeds to operation 230.

In operation 230, the user device 102 can determine if any movement is detected with the touch detected in operation 202. Thus, for example, the user device 102 can determine if a tough-drag gesture is detected, for example. A "touch-drag" gesture can include a touch at a contact point of an input device such as a touch-sensitive screen and movement of the finger, stylus, or other structure ("finger") used to make the gesture while the finger is left in contact with the input device. Thus, in operation 230, the user device 102 can be configured to determine if the finger associated with the touch detected in operation 202 has moved. Thus, the functionality described herein with respect to operation 230 can be, but is not necessarily, similar or even identical to the functionality described above with reference to operation 206 of FIG. 2A.

If the user device 102 determines, in operation 230, that no movement is associated with the touch, the method 200 can proceed to operation 232, wherein the user device 102 can launch a text edit mode. The text edit mode can be launched to allow a user to enter text associated with the object touched in operation 202. In some embodiments, the user device 102 launches a keyboard user interface or other functionality for enabling a user to enter text. An example of a keyboard user interface is illustrated and described below with reference to FIGS. 3N-3O. If the user device 102 determines, in operation 230, that movement is associated with the touch, the method 200 can proceed to operation 234.

In operation 234, the user device 102 can invoke a move command. Thus, the movement detected in operation 230 can be tracked by the user device 102 and applied to the object determined to have been touched in operation 204. Thus, objects can be moved by the touch input. From operations 232 and 234, the method 200 returns to operation 214 of FIG. 2A, wherein the method 200 ends.

Although not illustrated in detail in FIGS. 2A-2B, the user device 102 can be configured to identify other gestures and to invoke other commands in response thereto. For example, if a touch detected in operation 202 occurs in a shapes toolbar, for example, the functionality described herein with respect to operation 218 can be completed to determine if subsequent touches have been detected. In some embodiments of the concepts and technologies disclosed herein, a touch in the shapes toolbar can prompt the user device 102 to insert a shape or other object touched by the user. Subsequent touches in the workspace by a user while touching an object in the shapes toolbar can prompt the user device 102 to insert the object into the workspace. One example of the shape creation gesture is illustrated and described below with reference to FIGS. 3K-3M. Other commands such as two and three finger touch-drag commands, or the like, also are contemplated and are described in more detail below, particularly with reference to FIGS. 3A-3Q. Furthermore, subsequent touches on layered objects can be interpreted by the user device 102 as a command to select the layered objects in succession, from a top z-layered object toward and until a lowest-z-layered object. An example of this command is illustrated and described below with reference to FIG. 3Q. Because other gestures and commands can be interpreted by the user device 102, the described gestures and commands should be understood as being illustrative and should not be construed as being limiting in any way.

Although not described or illustrated separately in FIG. 2B, the user device 102 can be configured to take various actions in response to subsequent touches in addition to, or instead of, those illustrated and described above. Because illustration of these various actions would require extensive additional drawings, some embodiments of these actions are described below. In some embodiments, for example, a touch detected on an object that is not selected can result in selection of the object, as illustrated and described above with reference to operations 226-228. Although not illustrated in FIG. 2B, subsequent touches on the shape can trigger additional actions.

In some embodiments, for example, a touch subsequent to the touch that causes selection of the object in operation 228 can cause the user device 102 to display auto-connect options, if available. In some embodiments, auto-connect options can be turned on via options, menus, ribbon UIs, and/or otherwise. If auto-connect options are not enabled, or available, displaying the auto-connect options can be skipped. In some embodiments, auto-connect options can be displayed in a UI display menu or other UI that can hover over or near the selected object, similar in operation and/or presentation to the display of the contextual UI discussed above with reference to operation 220 and illustrated in FIGS. 3H-3I.

In some embodiments, a touch subsequent to the touch that causes display of the auto-connect options, if available, can cause the user device 102 to display the contextual UI discussed above with reference to operation 220. In some embodiments, a touch subsequent to the touch that causes display of the contextual UI as described immediately above can cause the user device 102 to launch a text edit mode as discussed above with reference to operation 232. Additionally, it should be understood that when the user device 102 is in the text edit mode, a tap outside of the text edit box can cause the user device 102 to return the shape or other object to a basic selected state, to a basic selected state with auto-connect options displayed (if available or enabled), and/or to other states. As such, while flow of the method 200 proceeds from operation 226 to operation 230, it should be understood that that various other operations can be performed between operations 226 and 232, and/or after operation 228.

Furthermore, subsequent taps or other touches after operations 228, 232, and/or 234 can cycle through these and/or other options described herein, though such subsequent touches and/or operations are not illustrated and described separately in detail in FIGS. 2A-2B. As such, the illustrated embodiments should be understood as being illustrative and should not be construed as being limiting in any way. In one contemplated embodiment of the concepts and technologies disclosed herein, a tap on an unselected object can cause the user device 102 to select that object. Other operations can be taken in response to the touch and/or subsequent touches. In some embodiments, a cycle of touch events can be launched when an object is selected, wherein subsequent touch events cycle through multiple functions that can be cycled through in a repeating manner. The functions can include, but are not limited to, an option to display the auto-connect options if enabled and/or available, an option to display the contextual UI described herein, and/or an option to enter a text edit mode. It should be understood that these functions are not listed in any particular order, and that other or alternative functions can be included in a function cycle such as that described herein. As such, the above embodiment is illustrative and should not be construed as being limiting in any way.

Figure 3A:
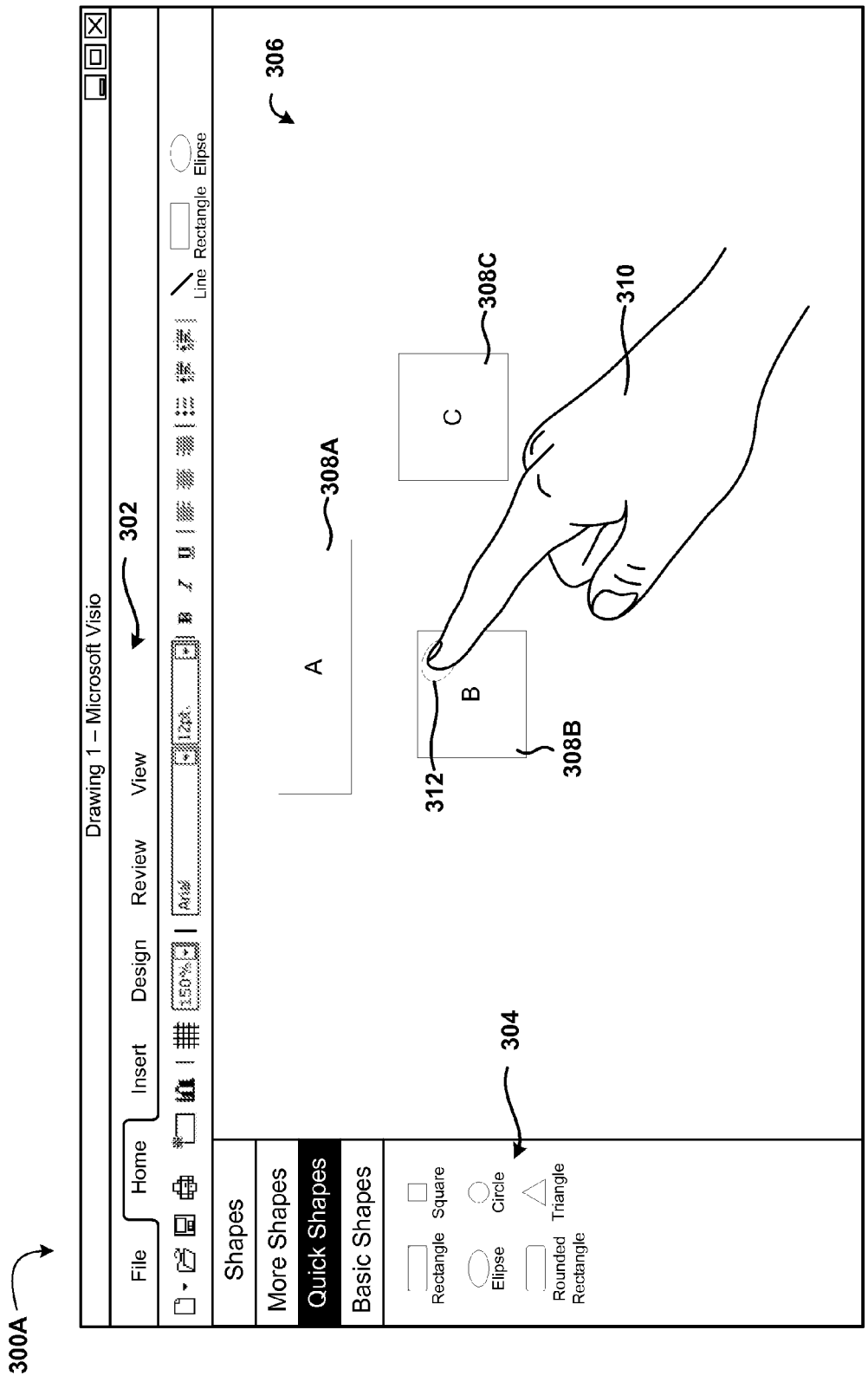
FIGS. 3A-3Q are user interface diagrams showing aspects of touch interactions with a drawing application, according to various illustrative embodiments.
Figure 3B:
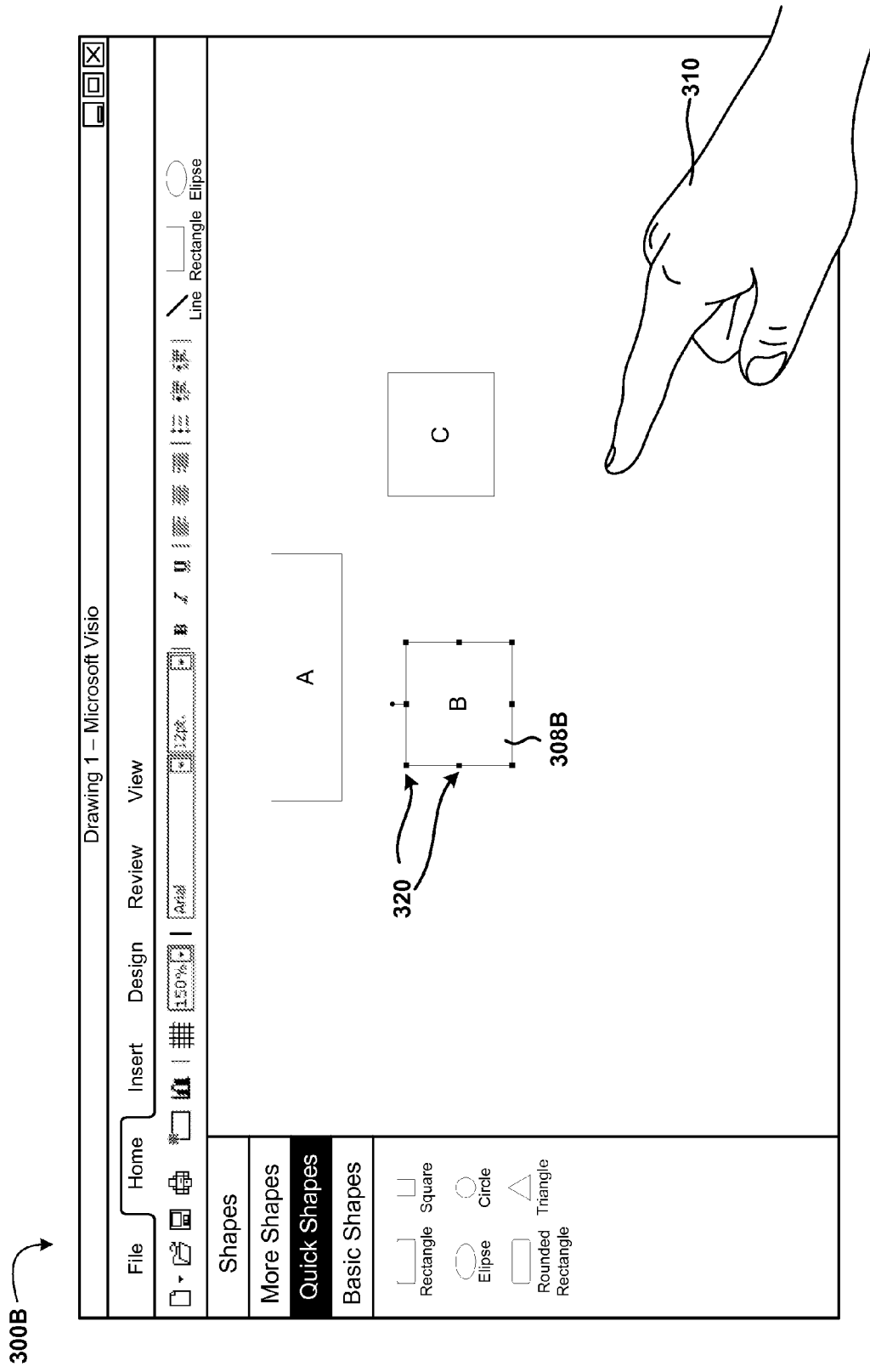
Figure 3C:
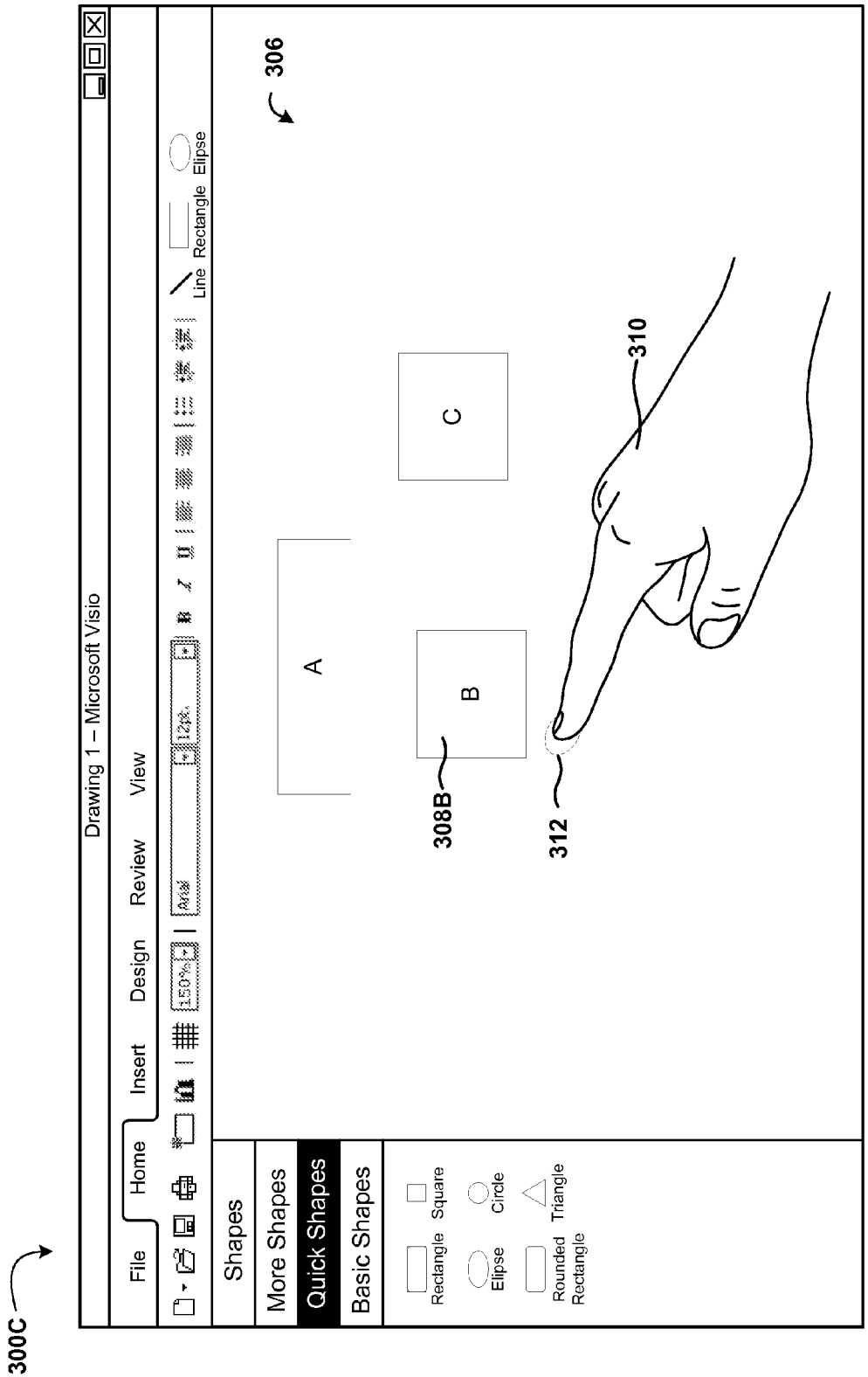
Figure 3D:
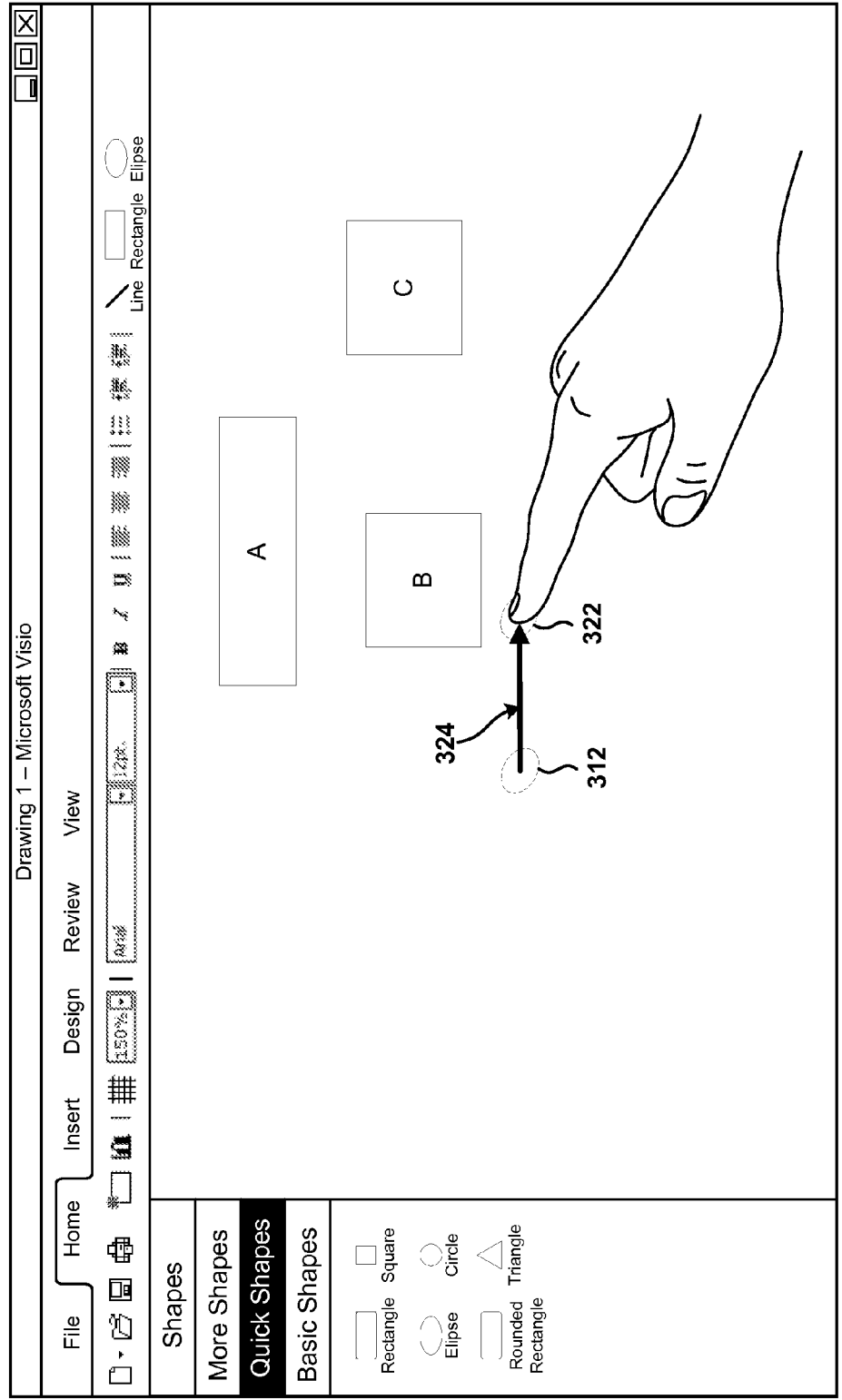
Figure 3E:
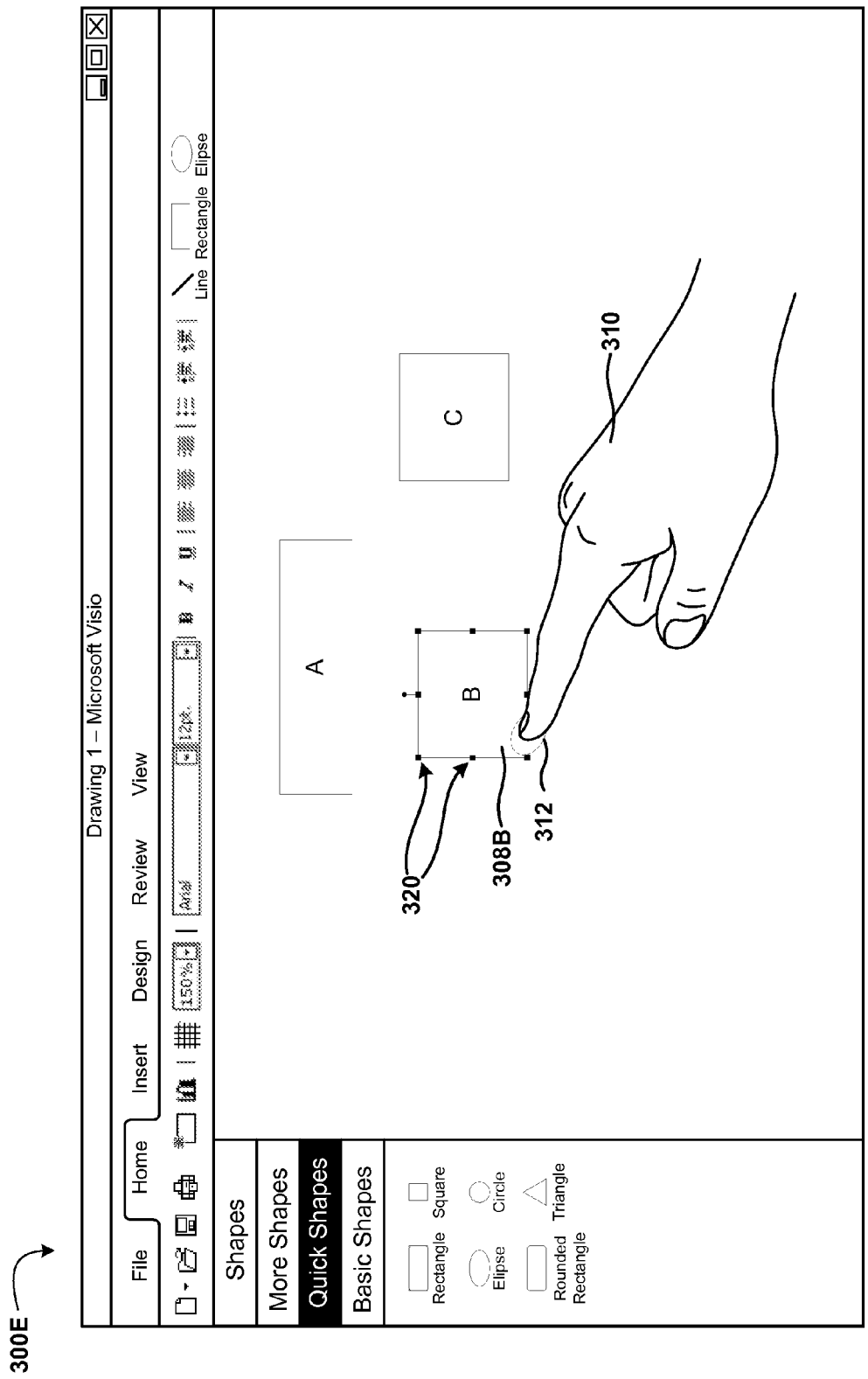
Figure 3F:
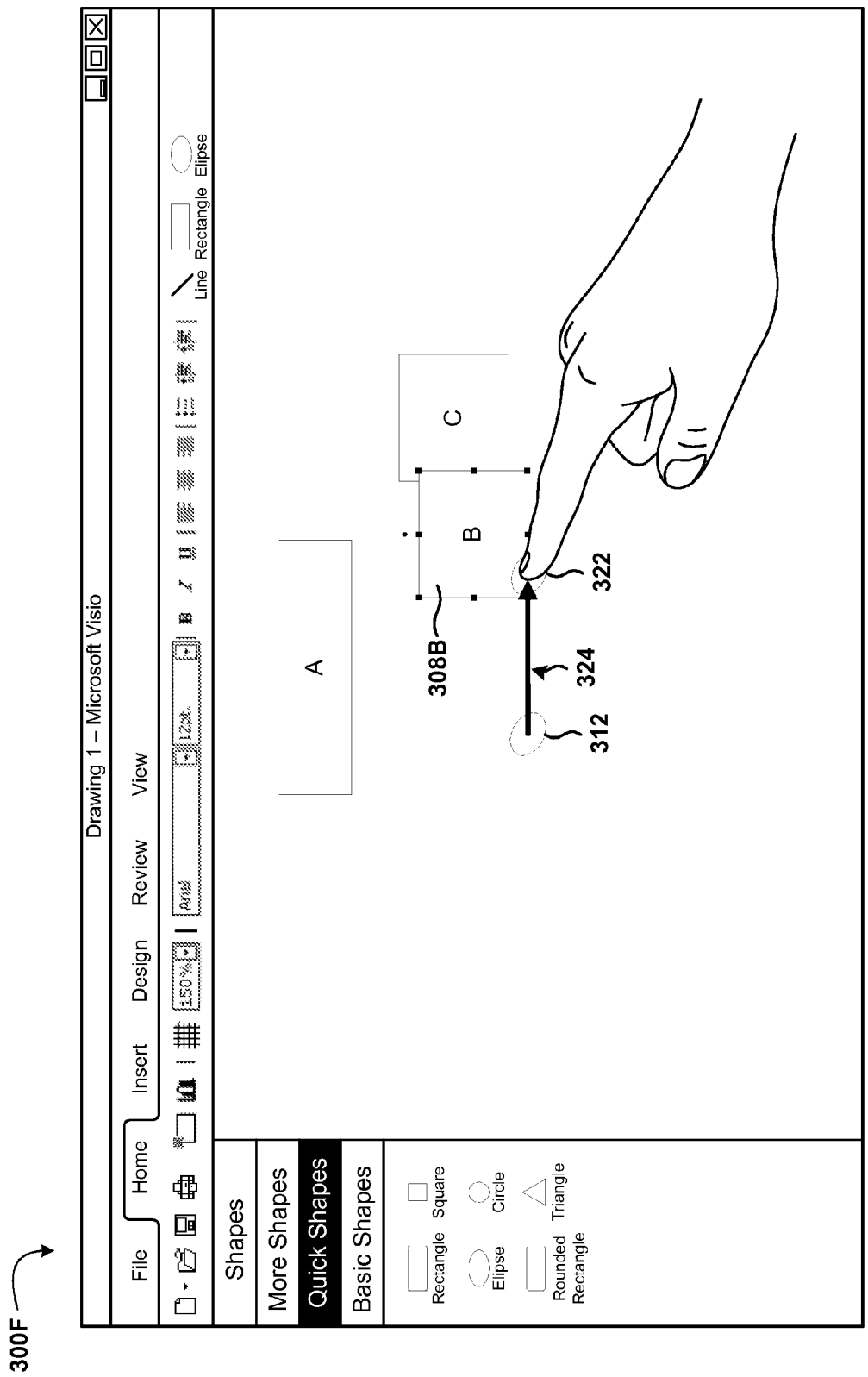
Figure 3G:
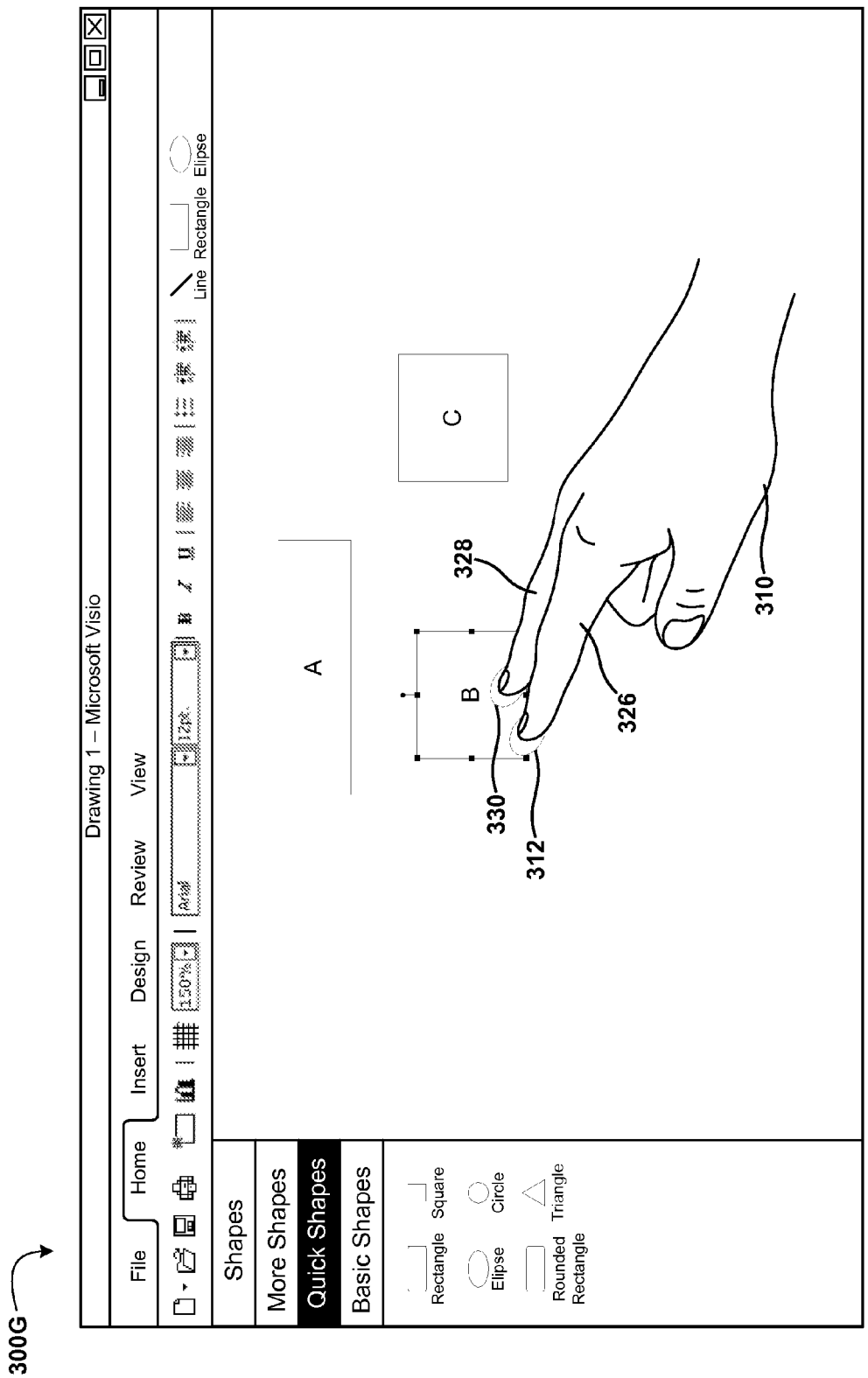
Figure 3H:
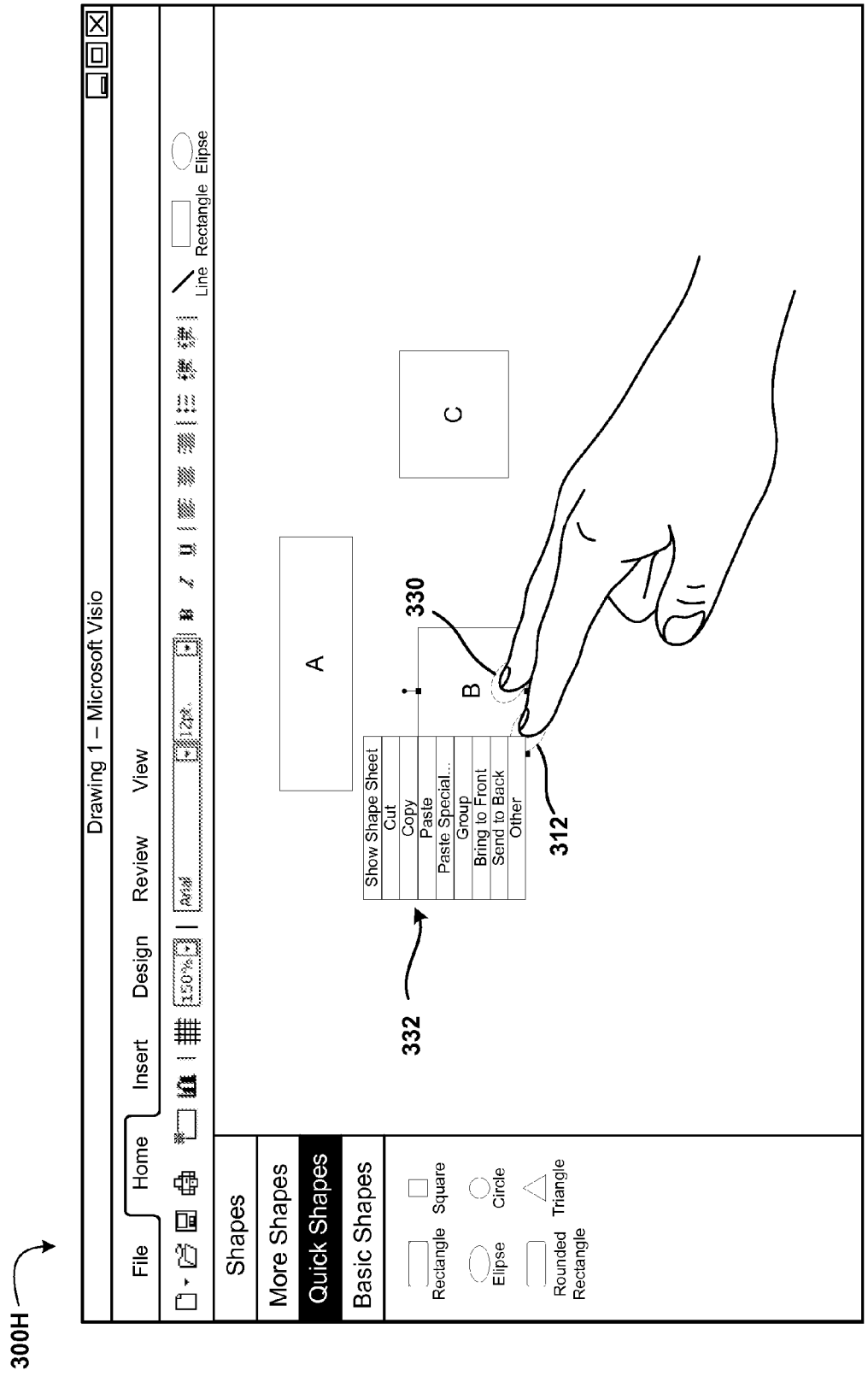
Figure 3I:
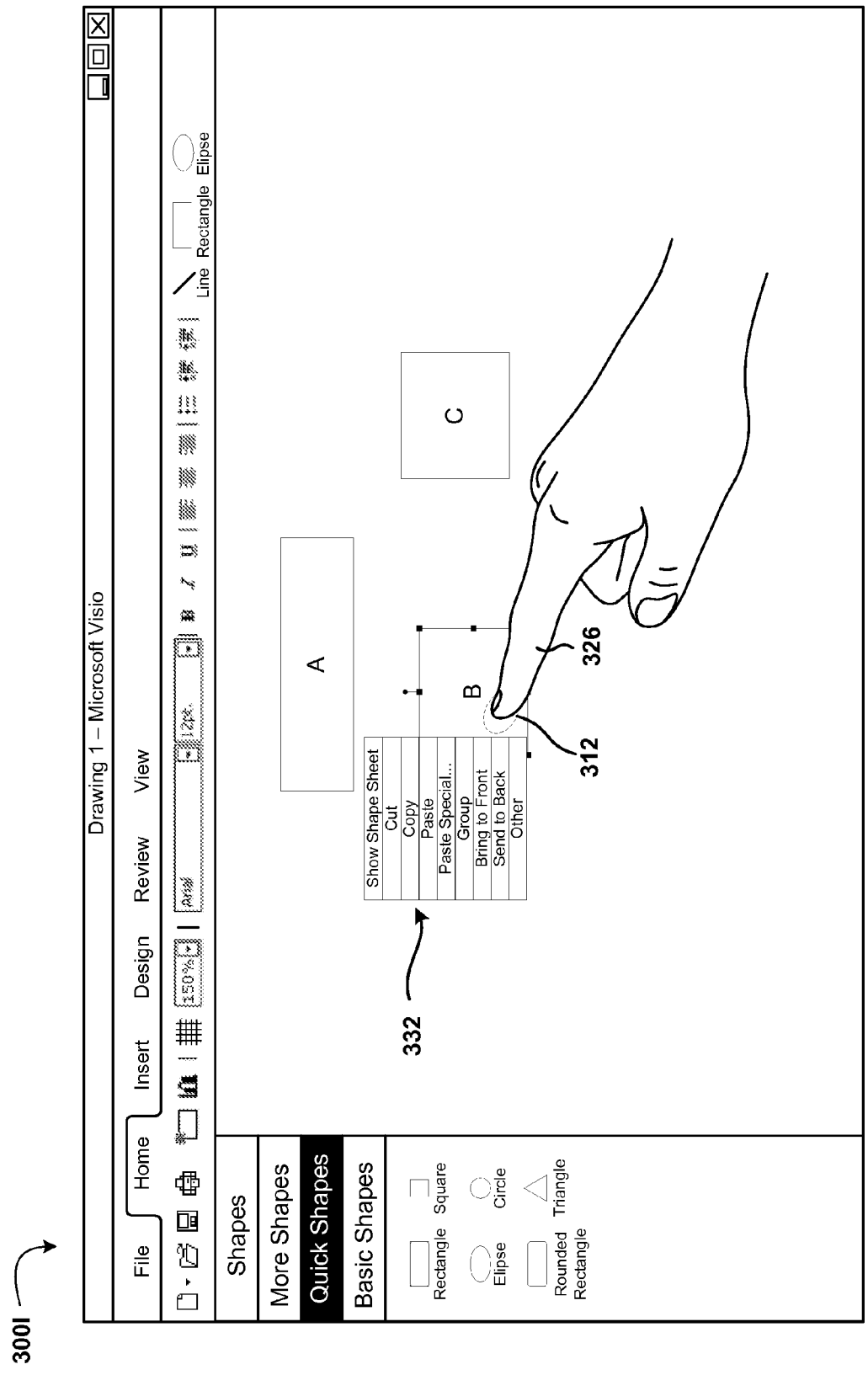
Figure 3J:
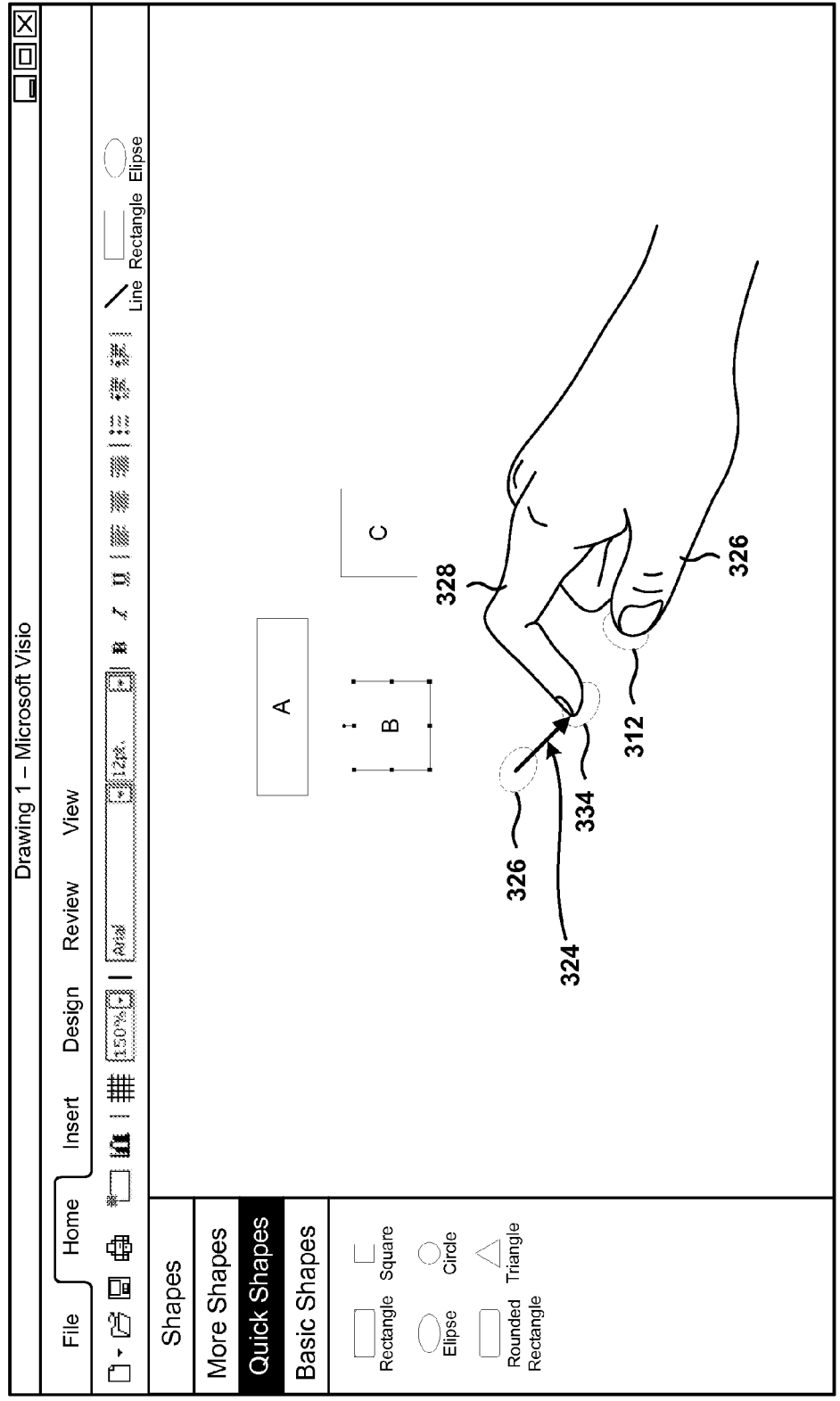
Figure 3K:
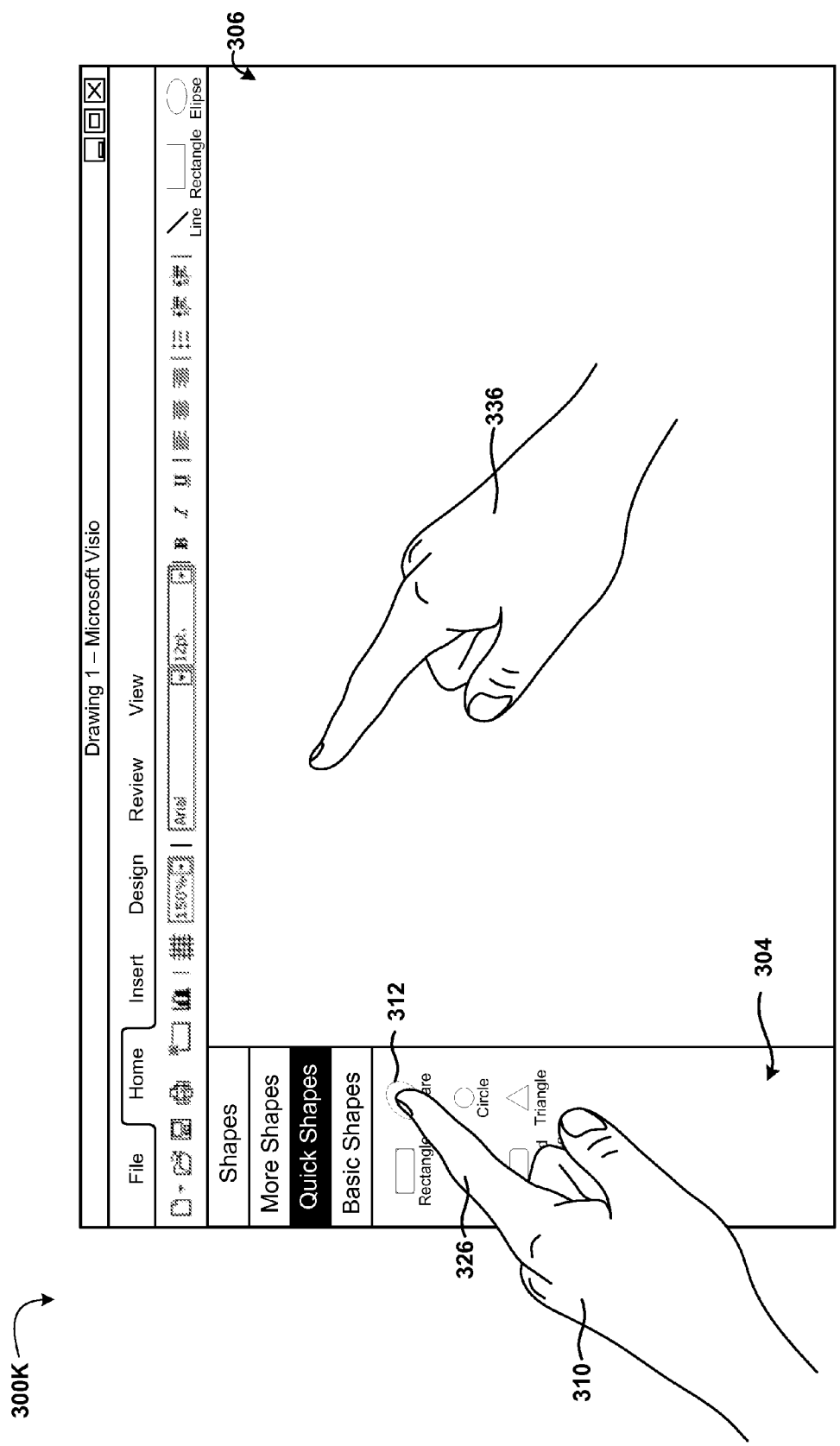
Figure 3L:
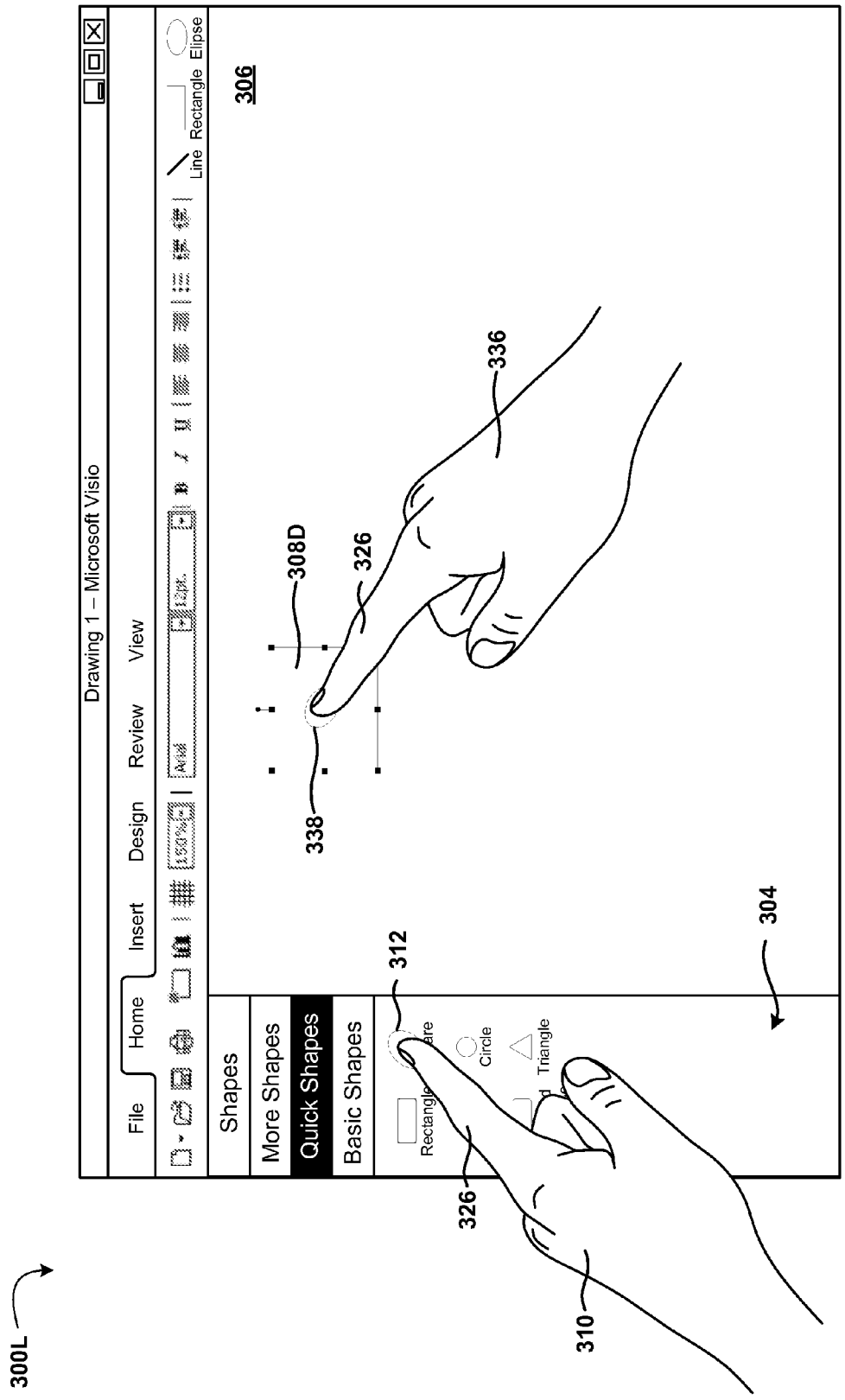
Figure 3M:
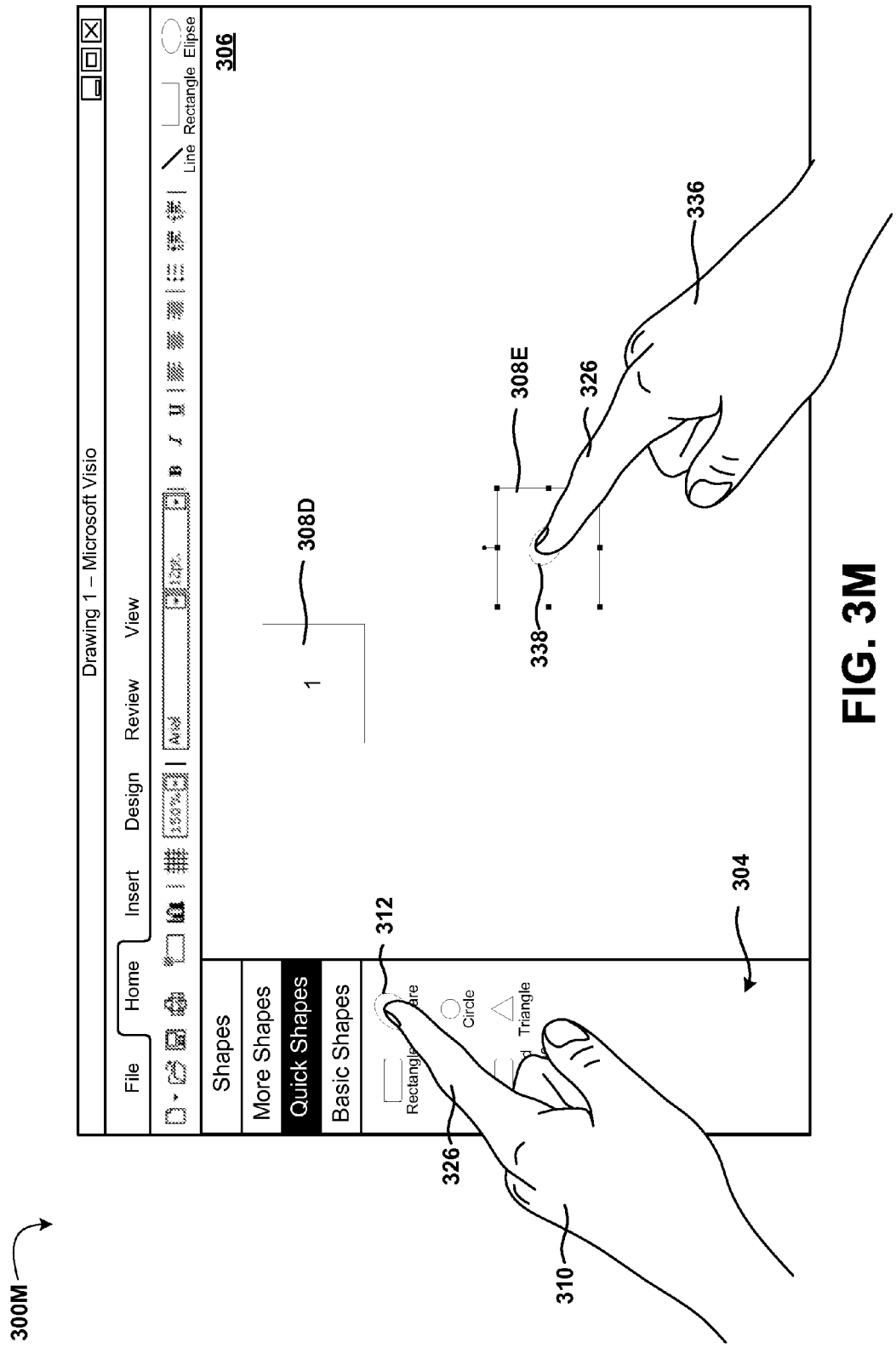
Figure 3N:
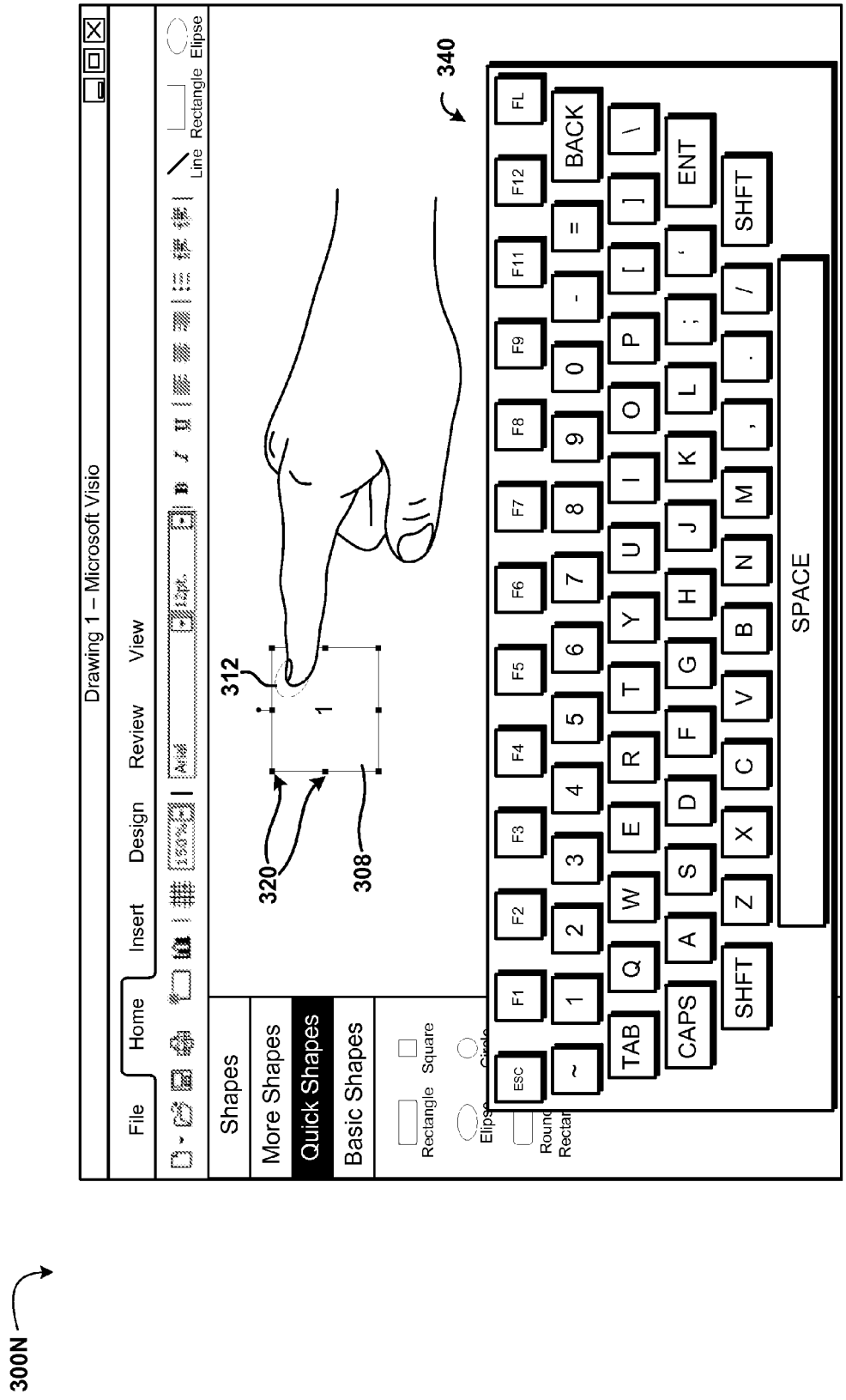
Figure 3O:
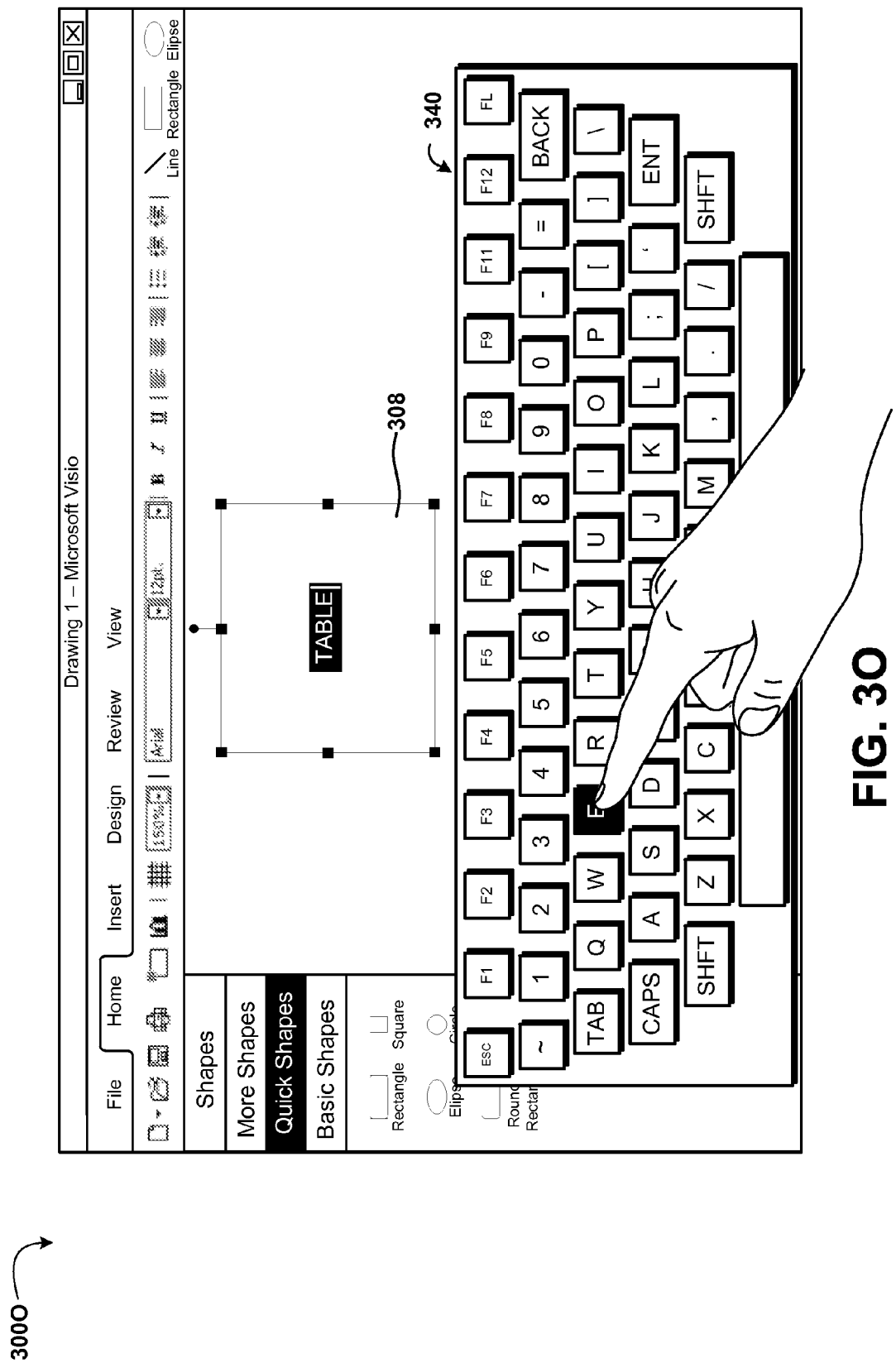
Figure 3P:
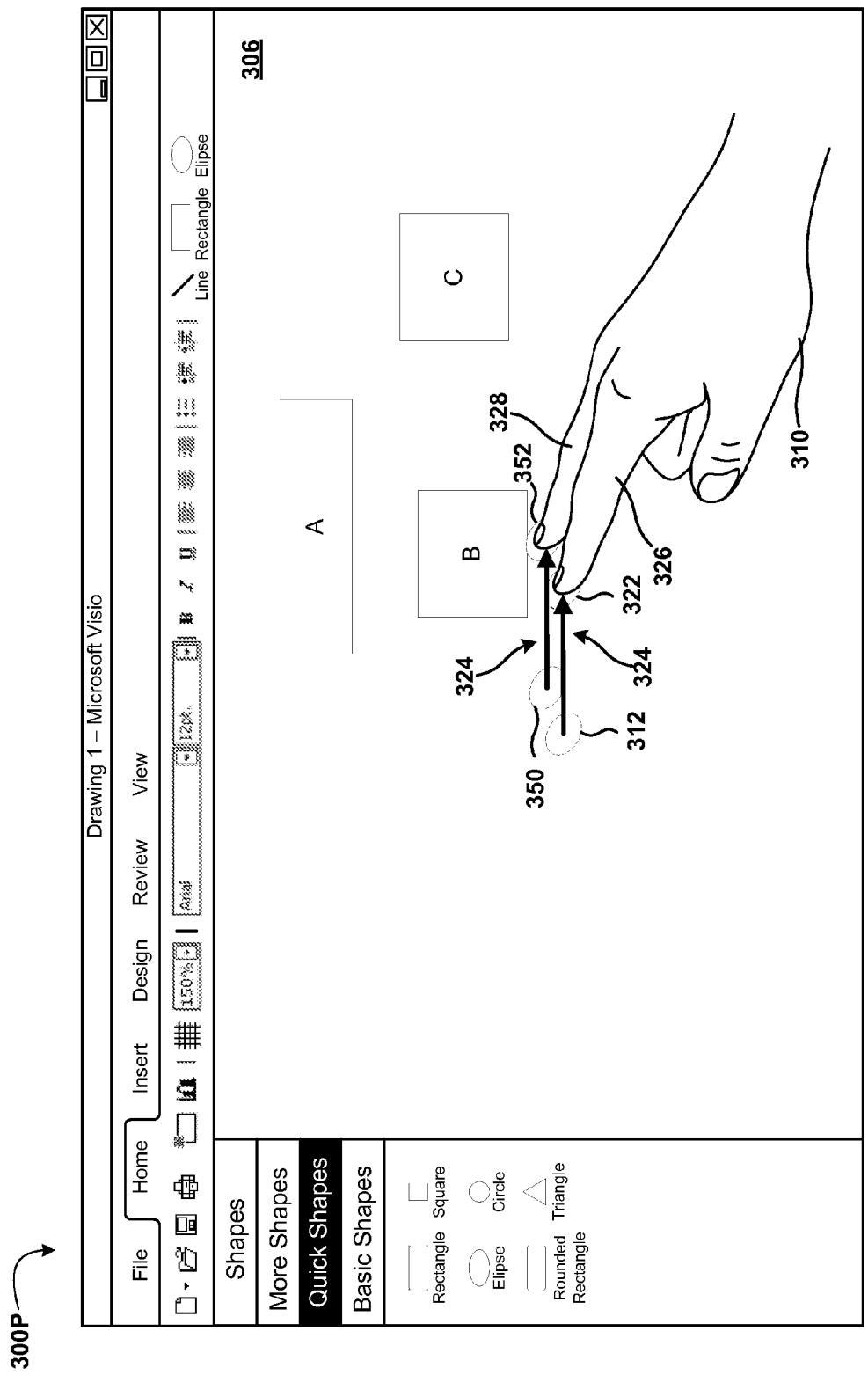
Figure 3Q:
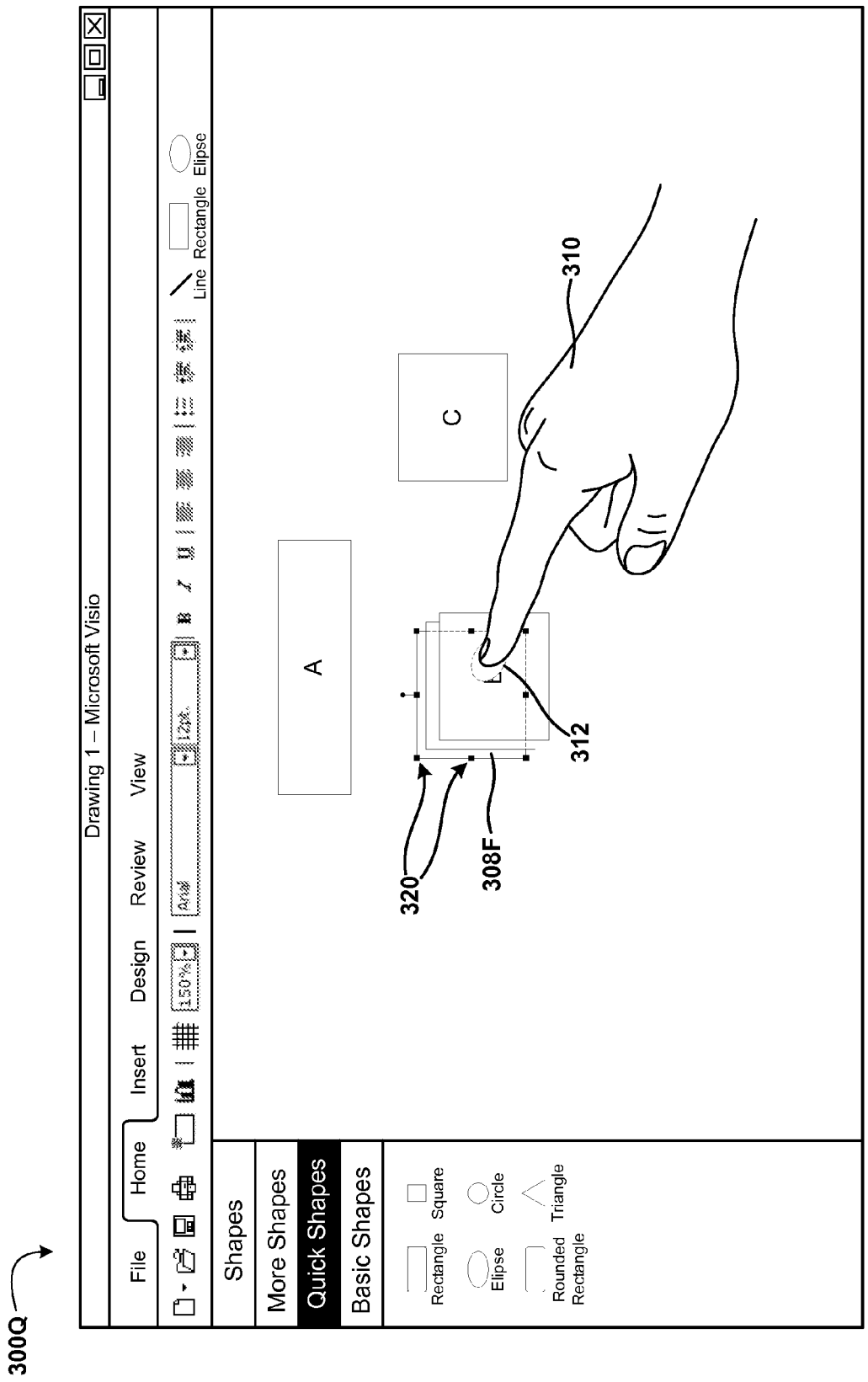

Turning now to FIGS. 3A-3Q, UI diagrams showing various aspects of the concepts and technologies disclosed herein for touch interactions with a drawing application will be described according to various illustrative embodiments. FIG. 3A shows an illustrative screen display 300A generated by a device such as the user device 102. In some embodiments, the screen display 300A corresponds to one or more of the UIs 112 shown in FIG. 1 and described above with reference to FIGS. 1-2B. It should be appreciated that the UI diagram illustrated in FIG. 3A is illustrative of one contemplated embodiment, and therefore should not be construed as being limited in any way.

As shown in FIG. 3A, the screen display 300A can include various menus and/or menu options in a command ribbon 302 and/or other arrangement. The screen display 300A also can include a shapes toolbar 304 for inserting various shapes or other drawing objects into a drawing displayed within a drawing canvas, area, or workspace ("workspace") 306. In the illustrated embodiment, the screen display 300A includes a representation of a drawing file generated by a member of the MICROSOFT VISIO family of drawing programs from Microsoft Corporation in Redmond, Wash. In particular, the screen display 300A is illustrated as including a drawing in the workspace 306. The displayed drawing can be rendered by the user device 102 and can be based upon the data 110 generated by the drawing application 114, wherein the drawing application 114 can correspond to a web-based version of a member of MICROSOFT VISIO family of drawing applications for creating, editing, saving, and/or viewing drawing files. Because other web-based and/or native drawing programs can be used to generate the data 110, it should be understood that this embodiment is illustrative, and should not be construed as being limiting in any way.

As shown in FIG. 3A, the workspace 306 can include a number of shapes 308A-C (hereinafter collectively and/or generically referred to as "shapes 308"). In the illustrated embodiment, the shapes 308 are shown as rectangles. Because the functionality of the shapes 308 can be provided by other shapes, by lines, by text, and/or by points or other objects, it should be understood that these embodiments are illustrative, and should not be construed as being limiting in any way. In the illustrated embodiment, the screen display 300A can be presented on a touch-sensitive or multi-touch-sensitive display associated with a device such as the user device 102. For purposes of illustration, and not limitation, a user's hand 310 is illustrated as making contact with a display screen being used to present the screen display 300A. In particular, the hand 310 is illustrated as contacting a display screen used to present the screen display 300A at a contact point or area ("contact area") 312. Because input devices or structures in addition to, or instead of, the illustrated hand 310 can be used in accordance with the concepts and technologies disclosed herein, it should be understood that this embodiment is illustrative, and should not be construed as being limiting in any way.

Referring now to FIG. 3B, a UI diagram showing additional aspects of the concepts and technologies disclosed herein for touch interactions with a drawing application are described in detail. In particular, FIG. 3B shows a screen display 300B generated by a device such as the user device 102. In some embodiments, the screen display 300B can be generated by the user device 102 in response to the touch gesture illustrated in FIG. 3A. In particular, in the embodiment shown in FIG. 3B, the user's hand 310 has been brought out of contact with a display screen used to present the screen display 300A. As such, FIGS. 3A-3B collectively can represent a tap gesture. It should be understood that this embodiment is illustrative, and should not be construed as being limiting in any way.

In the example tap gesture illustrated in FIGS. 3A-3B, the contact point 312 (shown in FIG. 3A) is illustrated as intersecting the shape 308B. As such, the user device 102 can interpret the tap gesture as corresponding to a command to select the shape 308B. In some embodiments, as described above with reference to FIGS. 2A-2B, movement of a hand 310 or other input mechanism such as a stylus, or the like, can be interpreted by the user device 102 as corresponding to requests for commands other than, or in addition to, the select command. Additionally, if a user holds his or her hand 310 in a single position for a defined period of time such as, for example, half a second, a second, or the like, the user device 102 can interpret the gesture as corresponding to yet other commands such as, for example, a command to display a contextual menu, a command to enter a text edit mode, or the like. These and other gestures have been described above with reference to FIGS. 2A-2B and are illustrated in more detail below with reference to FIGS. 3C-3N.

As shown in FIG. 3B, the user device 102 can be configured to display handles 320 associated with the shape 308B. In some embodiments, the handles 320 can be displayed in response to detecting a selection command with respect to the shape 308B. The handles 320, as generally is known, can be used to move, rotate, skew, and/or scale the shape 308B. In the illustrated embodiment, the user can tap and drag one or more of the handles 320 to perform these and other operations with respect to the shape 308B. Because other operations are possible and are contemplated, it should be understood that these embodiments are illustrative, and should not be construed as being limiting in any way.

Turning now to FIG. 3C, additional aspects of the concepts and technologies disclosed herein for touch interactions with a drawing application are described in detail. In particular, FIG. 3C shows a screen display 300C that can be generated by a device such as the user device 102. In FIG. 3C, the user's hand 310 has touched a display screen used to present the display screen 300E at the contact point 312. In FIG. 3C, the contact point 312 does not intersect any of the shapes 308. Referring now to FIG. 3D, a UI diagram showing additional aspects of the concepts and technologies disclosed herein for touch interactions with a drawing application are described in detail. In particular, FIG. 3D shows a screen display 300D generated by a device such as the user device 102. In the embodiment shown in FIG. 3D, the user's hand 310 has been moved, while in contact with a display screen used to present the display screens 300C, 300D, from the contact point 312 to a release point 322 along a movement path 324. While the handles 320 are not shown in FIGS. 3C-3D, it should be understood that the handles 320 could be shown in either or both of the screen displays 300C, 300D shown in FIGS. 3C-3D.

Referring now collectively to FIGS. 3C-3D, a pan gesture is illustrated. In particular, if the hand 310 contacts the screen used to display the screen display 300D in the workspace 308 at the contact point 312 and is removed from contact with the screen within a defined amount of time such as, for example, less than half of a second, less than a second, or the like, the user device 102 can be configured to recognize the tap gesture as corresponding to a deselect command, as mentioned above. If, however, the hand 310 contacts the screen and moves along the screen prior to being removed form contact with the screen, the user device 102 can be configured to recognize the tap-drag gesture as corresponding to a request to invoke a scroll or pan command. Execution of the pan command, by moving the displayed shapes 308 an amount corresponding to the magnitude and direction of the movement path 324 is illustrated in FIG. 3D. It should be understood that this embodiment is illustrative, and should not be construed as being limiting in any way.

FIGS. 3E-3F are UI diagrams showing additional aspects of the concepts and technologies disclosed herein for touch interactions with a drawing application are described in detail. In particular, FIGS. 3E-3F shows screen displays 300E, 300F, respectively, either or both of which can be generated by a device such as the user device 102. In FIG. 3E, the user's hand 310 has touched a display screen used to present the screen display 300E at another contact point 312. In this example, the contact point 312 intersects the shape 308B, and the user device 102 again has displayed the handles 320 discussed above with reference to FIG. 3B. It should be understood that this embodiment is illustrative, and should not be construed as being limiting in any way.

In FIG. 3F, the user's hand 310 has been moved, while in contact with the display screen used to present the screen displays 300E, 300F, from the contact point 312 to the release point 322 along the movement path 324. As such, FIGS. 3E-3F collectively illustrate another touch-drag or touch-and-drag gesture. In the example shown in FIGS. 3E-3F, however, the hand 310 contacts the screen used to display the screen displays 300E-300F at the contact point 312, which is shown as intersecting the shape 308B. Thus, the user device 102 can be configured to interpret the touch-drag gesture as corresponding to a move command instead of corresponding to a pan command as illustrated above with reference to FIGS. 3C-3D. In the illustrated embodiment, the move command can correspond to a command to move the shape 308B an amount and direction corresponding to the magnitude and direction of the movement path 324 shown in FIG. 3F. Execution of the move command is shown in FIG. 3F. It should be understood that this embodiment is illustrative, and should not be construed as being limiting in any way.

Referring now to FIG. 3G, a UI diagram showing additional aspects of the concepts and technologies disclosed herein for touch interactions with a drawing application are described in detail. In the embodiment shown in FIG. 3G, a first finger 326 of the user's hand 310 has been brought into contact with the display screen used to present the screen display 300G at the contact point 312, and subsequently, a second finger 328 of the user's hand 310 has been brought into contact with the display screen at a secondary contact point 330. While the user device 102 can be configured to interpret gestures entered with two fingers simultaneously or substantially simultaneously contacting the display screen, the embodiment shown in FIG. 3G can be distinguished from such gestures due to passage of a time period between the contacts at the contact point 312 and the secondary contact point 330. FIG. 3G represents what is referred to herein as a "tap-right-click" gesture. It should be understood that this embodiment is illustrative, and should not be construed as being limiting in any way.

The user device 102 can be configured to invoke various commands in response to the tap-right-click gesture illustrated in FIG. 3G. In one contemplated embodiment, the user device 102 can be configured to display the screen display 300H illustrated in FIG. 3H. As shown in FIG. 3H, the user device 102 can display a contextual user interface window ("contextual UI") 332 in response to the tap-right-click gesture shown in FIG. 3G. As such, the tap-right-click gesture can be used to trigger commands that may be triggered by a right-button-click on a mouse or other similar input device, though this is not necessarily the case.

In the embodiment shown in FIG. 3H, the contextual UI 332 displays various options for modifying or interacting with the shape 308B, since the tap-right-click gesture is made at a point that intersects with the shape 308B. According to some embodiments, the user device 102 can be configured to associated the tap-right-click gesture with a shape such as the shape 308B if the first contact point 312 intersects the shape. Because the contextual UI 332 can be accessed via other commands, and because the user device 102 can associated the tap-right-click gesture with a shape such as the shape 308B in response to other considerations, the illustrated embodiment should be understood as being illustrative, and should not be construed as being limiting in any way.

Referring now to FIG. 3I, a UI diagram showing additional aspects of the concepts and technologies disclosed herein for touch interactions with a drawing application are described in detail. In the embodiment shown in FIG. 3I, another command for displaying the contextual UI 332 is illustrated and described, according to another illustrative embodiment. In FIG. 3I, the first finger 326 of the user's hand 310 has been brought into contact with the display screen used to present the screen display 300I at the contact point 312. Rather than removing the first finger 326 or supplementing this contact with an additional finger, however, the user has held the first finger 326 in contact with the display screen for a defined period of time such as, for example, a quarter of a second, a half of a second, a second, or the like. Thus, FIG. 3I can illustrate what is sometimes referred to as a "tap-hold" or "tap-and-hold" gesture.

In some embodiments, the user device 102 can be configured to interpret the tap-hold gesture as corresponding to a command to access the contextual UI 332. In other embodiments, the tap-hold gesture can be used to access additional or alternative options, commands, or UIs. As such, the illustrated embodiment should be understood as being illustrative, and should not be construed as being limiting in any way.

Referring now to FIG. 3J, a UI diagram showing additional aspects of the concepts and technologies disclosed herein for touch interactions with a drawing application are described in detail. In the embodiment shown in FIG. 3J, pinch gesture is illustrated and described, according to another illustrative embodiment. In FIG. 3J, the first finger 326 of the user's hand 310 has been brought into contact with the display screen used to present the screen display 300J at the contact point 312. Subsequently, or substantially simultaneously, the second finger 328 of the user's hand 310 has been brought into contact with the display screen at the secondary contact point 330 and moved along the movement path 324 to a secondary release point 334. As such, FIG. 3J can illustrated what is referred to herein as a "pinch gesture."

According to some embodiments, the user device 102 can be configured to interpret a pinch gesture in at least two ways. In the embodiment shown in FIG. 3J, wherein the pinch gesture is made on the workspace 306, the user device 102 can be configured to interpret the pinch gesture as corresponding to zoom command and can zoom out or zoom in, depending upon the direction of the movement path 324. In particular, if the fingers or other structures used to form the pinch gesture move toward one another, the user device 102 can be configured to zoom the display in, and if the fingers or other structures used to form the pinch gesture move away from another, the user device 102 can be configured to zoom the display out. It should be understood that these embodiments are illustrative, and should not be construed as being limiting in any way.

In another embodiment, the user device 102 can be configured to interpret a pinch gesture made on top of a shape 308 as corresponding to a command to scale the shape 308 on which the pinch gesture is made. As such, if the pinch gesture shown in FIG. 3J is made on top of the shape 308B, the user device 102 can be configured to scale the shape 308B. In some of these embodiments, if the fingers or other structures used to form the pinch gesture move toward one another, the user device 102 can be configured to make the shape 308B smaller, and if the fingers or other structures used to form the pinch gesture move away from another, the user device 102 can be configured to make the shape 308B larger. It should be understood that these embodiments are illustrative, and should not be construed as being limiting in any way.

Referring now to FIG. 3K, a UI diagram showing additional aspects of the concepts and technologies disclosed herein for touch interactions with a drawing application are described in detail. In the embodiment shown in FIG. 3K, one example of a shape creation gesture is illustrated and described, according to another illustrative embodiment. In FIG. 3K, the first finger 326 of the user's hand 310 has been brought into contact with the display screen used to present the screen display 300K at the contact point 312. In FIG. 3K, the contact point 312 is in the shapes toolbar 304, though this is not necessarily the case. As shown in FIG. 3K, a second hand 336 is shown in proximity to the display screen used to display the screen display 300K.

In FIG. 3L, the second hand 336 has been brought into contact with the display screen used to display the screen display 300L at a second hand contact point 338. In response to the simultaneous contacts at the contact point 312 and the second hand contact point 338, the user device 102 can identify a shape creation gesture. In response to the shape creation gesture, the user device 102 can create a shape 308D in the workspace 306. In the illustrated embodiment, the user device 102 creates the shape 308D by locating the center of the shape 308D at the center of the second hand contact point 338. It should be understood that this embodiment is illustrative, and should not be construed as being limiting in any way.

In FIG. 3M, the second hand 336 has been brought into contact with the display screen used to display the screen display 300L at another second hand contact point 338. In response to the additional contact at the other second hand contact point 338, the user device 102 has created another shape 308E in the workspace 306. As such, it can be appreciated that the shape creation gesture can be used to create shapes 308 without dragging and dropping the shapes from the shapes toolbar 304 into the workspace 306. In some other embodiments, tap gestures or double-tap gestures sensed in the shapes toolbar 304 can be interpreted as requests to add shapes to the workspace 306, and in response thereto, the user device 102 can add a shape to the center of the workspace 306. For example, in some embodiments, a user can select a shape in the shapes toolbar 304. A subsequent double tap gesture in the workspace 306 can be used to create shapes in the workspace 306 instead of, or in addition to, the gesture illustrated and described above for creating shapes in the workspace 306. As such, the illustrated shape creation gesture is illustrative of one command for creating shapes, and should not be construed as being limiting in any way.

Referring now collectively to FIGS. 3N-3O, UI diagrams showing additional aspects of the concepts and technologies disclosed herein for touch interactions with a drawing application are described in detail. In the embodiment shown in FIGS. 3N-3O, a gesture for entering a text edit mode is illustrated and described, according to an illustrative embodiment. In FIG. 3N, the user's hand 310 has been brought into contact with the display screen used to present the screen display 300N at the contact point 312. In FIG. 3N, the contact point 312 intersects with a selected shape 308, as illustrated by the handles 320. In the illustrated embodiment, the contact of the user's hand 310 corresponds to a tap gesture.

In response to detecting the tap gesture on the selected shape 308, the user device 102 can enter a text edit mode for editing text associated with the selected shape 308. As such, the user device 102 can be configured to modify the screen display 300N to show a keyboard UI 340. The user can interact with the keyboard UI 340 as shown in FIG. 3O to enter desired text for the selected shape 308. Because other gestures or movements can be used to invoke the text edit mode, it should be understood that that the illustrated embodiment is illustrative and should not be construed as being limiting in any way.

The screen display 300O also illustrates another feature that can be provided in accordance with the concepts and technologies disclosed herein. Namely, when the shape 308 is selected, the user device 102 can apply a zoom command to enlarge the shape 308, thereby making it easier to read the entered text. In some embodiments, the user device 102 is configured to store a zoom level, a selection, and a panning position when the text editing mode is entered or commenced. The user device 102 can support zooming, panning, and selection during the text editing mode and can be configured to return the UIs 112 to a selection, zoom level, and/or pan position when the text editing mode is exited.

In one contemplated example of the above features, a user can launch the text editing mode with selection of a first shape. Within the text editing mode, the user device 102 can zoom into the first shape, the user can then pan to and select a second shape and enter text for the second shape. Upon exiting the text editing mode, the user device 102 can update the UIs 112 to select the first shape and return the display to a zoom level and pan position that existed when the text editing mode was commenced. It should be understood that this embodiment is illustrative, and should not be construed as being limiting in any way.

Referring now to FIG. 3P, additional aspects of the concepts and technologies disclosed herein for touch interactions with a drawing application are described in detail. In particular, FIG. 3P shows a screen display 300P generated by a device such as the user device 102. In the embodiment shown in FIG. 3P, the user's hand 310 has been moved, while two fingers 326, 238 are in contact with a display screen used to present the display screen 300P. In FIG. 3P, the fingers 326, 328 have been moved, respectively, from the contact point 312 to a release point 322 and from the secondary contact point 350 to a secondary release point 352, both of which have occurred along the movement paths 324. Thus, FIG. 3P illustrates what is referred to herein as a "two fingered pan" gesture.

According to various embodiments, the two fingered pan gesture can be used to pan the displayed canvas or workspace 306, regardless of whether or not the gesture is completed on top of shapes or not on top of shapes. In some embodiments, users use two fingers to enhance control during panning. The user device 102 can be configured to average the distance and direction of the movement paths 324, if desired, and to apply the pan command based upon the average. It should be understood that this embodiment is illustrative, and should not be construed as being limiting in any way.

Referring now to FIG. 3Q, additional aspects of the concepts and technologies disclosed herein for touch interactions with a drawing application are described in detail. In particular, FIG. 3Q shows a screen display 300Q generated by a device such as the user device 102. In the embodiment shown in FIG. 3Q, the user's hand 310 has contacted the display screen used to present the display screen 300Q three times at the contact point 312. According to various embodiments, stacked or layered objects can be clicked or tapped through via a "drill down" gesture. This "drill down" gesture can correspond to multiple taps on layered or stacked objects such as the shapes 308. In the illustrated embodiment, the shape 308F is illustrated as being selected, as can be seen by the handles 320. It should be understood that this embodiment is illustrative, and should not be construed as being limiting in any way.

While various gestures and orders of touch events have been described herein, it should be understood that that in some embodiments, a gesture or touch event may not be evaluated until the touch gesture has been released or otherwise completed. In some embodiments, for example, the user device 102 can be configured to monitor a touch input device for a touch-down event, corresponding to initiation of a touch event, and a touch-up event, corresponding to completion or release of the touch event. Thus, the touch-down event can be evaluated to determine if the touch-down event is a primary touch or a secondary touch. If the touch-down event corresponds to a secondary touch, the user device 102 can determine if another gesture already is in process (a pan or zoom, for example), and if so, the secondary touch may be disregarded, may be used to terminate the other gesture, and/or may be used to further interpret the other gesture. Other processing can be completed at the time the touch-up event is detected, if desired, such as determining how much movement is detected, a contact time, objects that are or are not intersected by the touch, or the like. It should be understood that these embodiments are illustrative, and should not be construed as being limiting in any way.

It further should be understood that determinations as to if shapes are intersected or not can occur before a gesture is released, after a gesture is released, or at other times. In some embodiments, for example, a touch-up event is detected before the user device 102 determines if any shapes or other objects have been intersected by the gesture. Thus, the illustrated embodiments are illustrative and should not be construed as being limiting in any way.

Although not illustrated in FIGS. 3A-3N, some embodiments of the concepts and technologies disclosed herein also include a multi-select gesture. The multi-select gesture can be completed by selecting and holding a shape or other object. Thus, the multi-select gesture can be similar, at first, to a press-and-hold gesture as described herein. Subsequently, additional touches can be detected while the first touch continues to hold the shape or other object. Shapes touched by the subsequent touches can have their selection states altered by the touches. In particular, a shape or other object that was selected can be deselected if touched, and a shape or other object that was not selected can be selected if touched. This multi-select gesture can be completed or ended by releasing the first touch. It should be understood that this embodiment is illustrative, and should not be construed as being limiting in any way.

Figure 4:
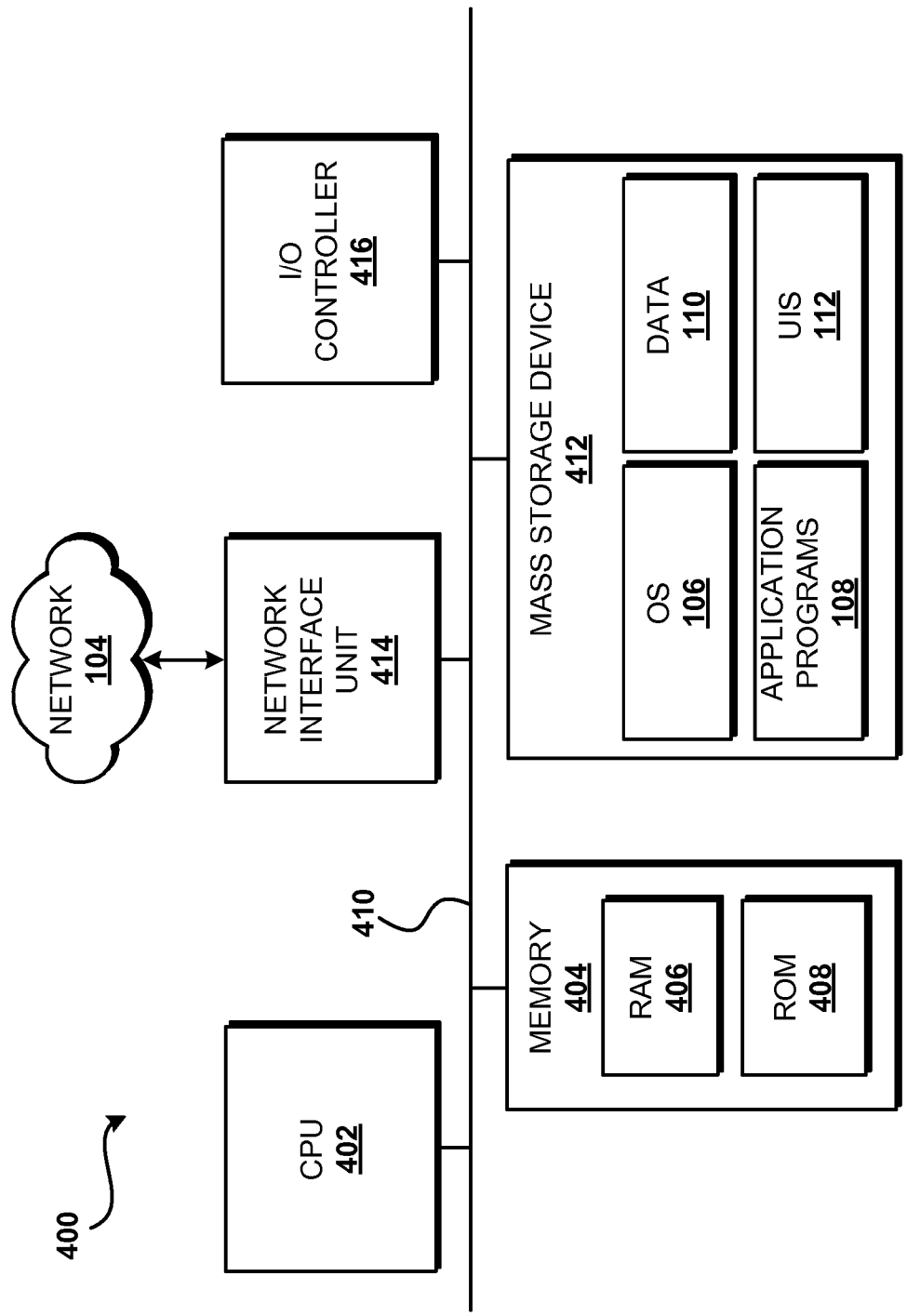
FIG. 4 is a computer architecture diagram illustrating an illustrative computer hardware and software architecture for a computing system capable of implementing aspects of the embodiments presented herein.

FIG. 4 illustrates an illustrative computer architecture 400 for a device capable of executing the software components described herein for touch interactions with a drawing application. Thus, the computer architecture 400 illustrated in FIG. 4 illustrates an architecture for a server computer, mobile phone, a PDA, a smart phone, a desktop computer, a netbook computer, a tablet computer, and/or a laptop computer. The computer architecture 400 may be utilized to execute any aspects of the software components presented herein.

The computer architecture 400 illustrated in FIG. 4 includes a central processing unit 402 ("CPU"), a system memory 404, including a random access memory 406 ("RAM") and a read-only memory ("ROM") 408, and a system bus 410 that couples the memory 404 to the CPU 402. A basic input/output system containing the basic routines that help to transfer information between elements within the computer architecture 400, such as during startup, is stored in the ROM 408. The computer architecture 400 further includes a mass storage device 412 for storing the operating system 106 and one or more application programs including, but not limited to, the application programs 108 described above. The mass storage device 412 also can be configured to store the data 110, the UIs 112, the drawing application 116, and/or other data, if desired.

The mass storage device 412 is connected to the CPU 402 through a mass storage controller (not shown) connected to the bus 410. The mass storage device 412 and its associated computer-readable media provide non-volatile storage for the computer architecture 400. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 400. For purposes the claims, the phrase "computer storage medium" and variations thereof, does not include waves, signals, and/or other transitory and/or intangible communication media, per se.

According to various embodiments, the computer architecture 400 may operate in a networked environment using logical connections to remote computers through a network such as the network 104. The computer architecture 400 may connect to the network 104 through a network interface unit 414 connected to the bus 410. It should be appreciated that the network interface unit 414 also may be utilized to connect to other types of networks and remote computer systems such as, for example, the server computer 114. The computer architecture 400 also may include an input/output controller 416 for receiving and processing input from a number of other devices, including a keyboard, mouse, or electronic stylus (not shown in FIG. 4). Similarly, the input/output controller 416 may provide output to a display screen, a printer, or other type of output device (also not shown in FIG. 4).

It should be appreciated that the software components described herein may, when loaded into the CPU 402 and executed, transform the CPU 402 and the overall computer architecture 400 from a general-purpose computing system into a special-purpose computing system customized to facilitate the functionality presented herein. The CPU 402 may be constructed from any number of transistors or other discrete circuit elements, which may individually or collectively assume any number of states. More specifically, the CPU 402 may operate as a finite-state machine, in response to executable instructions contained within the software modules disclosed herein. These computer-executable instructions may transform the CPU 402 by specifying how the CPU 402 transitions between states, thereby transforming the transistors or other discrete hardware elements constituting the CPU 402.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 400 in order to store and execute the software components presented herein. It also should be appreciated that the computer architecture 400 may include other types of computing devices, including hand-held computers, embedded computer systems, personal digital assistants, and other types of computing devices known to those skilled in the art. It is also contemplated that the computer architecture 400 may not include all of the components shown in FIG. 4, may include other components that are not explicitly shown in FIG. 4, or may utilize an architecture completely different than that shown in FIG. 4.

Figure 5:
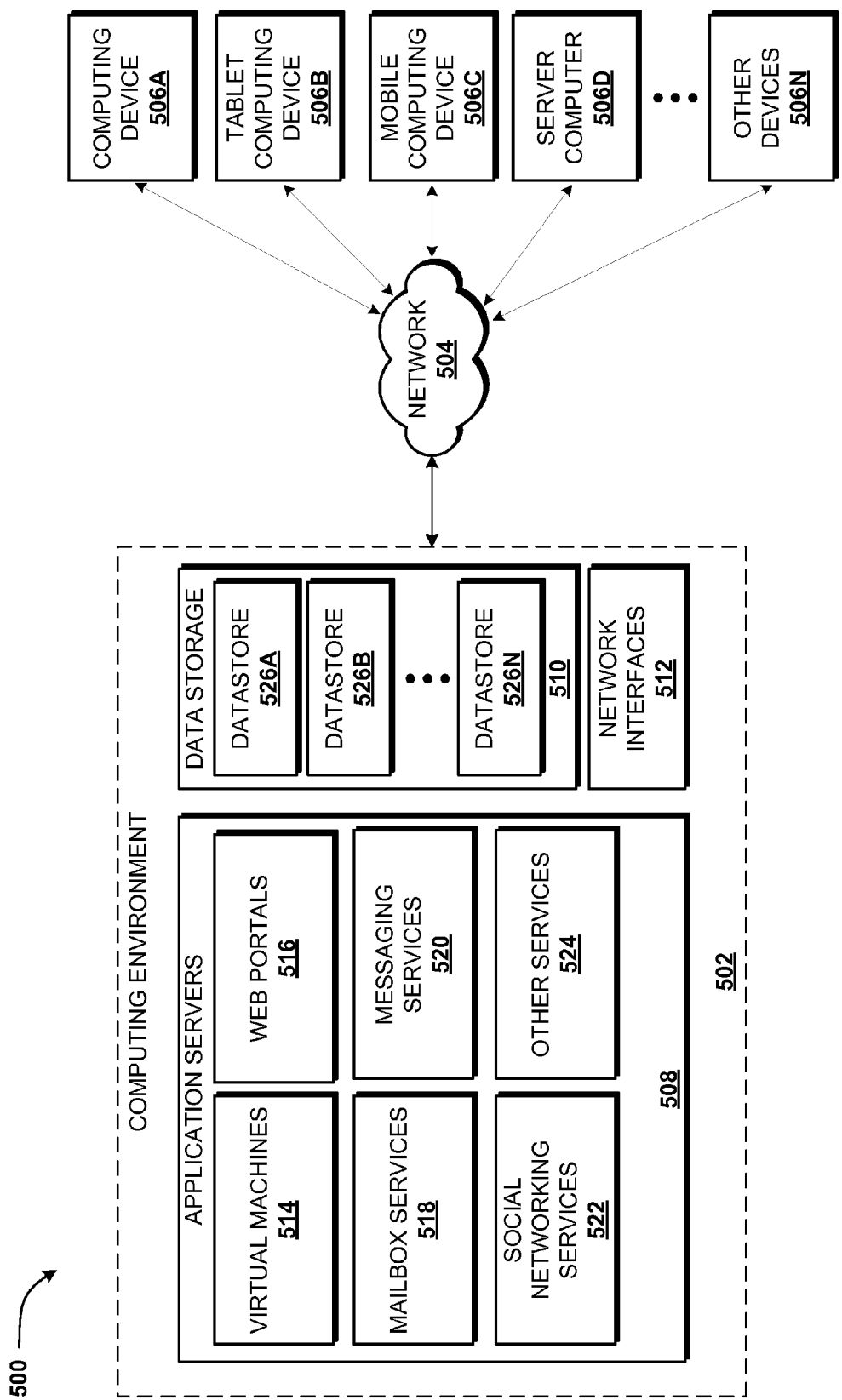
FIG. 5 is a diagram illustrating a distributed computing environment capable of implementing aspects of the embodiments presented herein.

FIG. 5 illustrates an illustrative distributed computing environment 500 capable of executing the software components described herein for touch interactions with a drawing application. Thus, the distributed computing environment 500 illustrated in FIG. 5 can be used to provide the functionality described herein with respect to the user device 102 and/or the server computer 114. The distributed computing environment 500 thus may be utilized to execute any aspects of the software components presented herein.

According to various implementations, the distributed computing environment 500 includes a computing environment 502 operating on, in communication with, or as part of the network 504. The network 504 also can include various access networks. According to various implementations, the functionality of the network 504 can be provided by the network 104 illustrated in FIG. 1. One or more client devices 506A-506N (hereinafter referred to collectively and/or generically as "clients 506") can communicate with the computing environment 502 via the network 504 and/or other connections (not illustrated in FIG. 5). In the illustrated embodiment, the clients 506 include a computing device 506A such as a laptop computer, a desktop computer, or other computing device; a slate or tablet computing device ("tablet computing device") 506B; a mobile computing device 506C such as a mobile telephone, a smart phone, or other mobile computing device; a server computer 506D; and/or other devices 506N. It should be understood that any number of clients 506 can communicate with the computing environment 502. Two example computing architectures for the clients 506 are illustrated and described herein with reference to FIGS. 4 and 6. It should be understood that the illustrated clients 506 and computing architectures illustrated and described herein are illustrative, and should not be construed as being limited in any way.

In the illustrated embodiment, the computing environment 502 includes application servers 508, data storage 510, and one or more network interfaces 512. According to various implementations, the functionality of the application servers 508 can be provided by one or more server computers that are executing as part of, or in communication with, the network 504. The application servers 508 can host various services, virtual machines, portals, and/or other resources. In the illustrated embodiment, the application servers 508 host one or more virtual machines 514 for hosting applications or other functionality. According to various implementations, the virtual machines 514 host one or more applications and/or software modules for providing the functionality described herein for touch interactions with a drawing application. It should be understood that this embodiment is illustrative, and should not be construed as being limiting in any way. The application servers 508 also host or provide access to one or more Web portals, link pages, Web sites, and/or other information ("Web portals") 516.

According to various implementations, the application servers 508 also include one or more mailbox services 518 and one or more messaging services 520. The mailbox services 518 can include electronic mail ("email") services. The mailbox services 518 also can include various personal information management ("PIM") services including, but not limited to, calendar services, contact management services, collaboration services, and/or other services. The messaging services 520 can include, but are not limited to, instant messaging services, chat services, forum services, and/or other communication services.

The application servers 508 also can include one or more social networking services 522. The social networking services 522 can include various social networking services including, but not limited to, services for sharing or posting status updates, instant messages, links, photos, videos, and/or other information; services for commenting or displaying interest in articles, products, blogs, or other resources; and/or other services. In some embodiments, the social networking services 522 are provided by or include the FACEBOOK social networking service, the LINKEDIN professional networking service, the MYSPACE social networking service, the FOURSQUARE geographic networking service, the YAMMER office colleague networking service, and the like. In other embodiments, the social networking services 522 are provided by other services, sites, and/or providers that may or may not explicitly be known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 522 also can include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services 522 are not mentioned herein for the sake of brevity. As such, the above embodiments are illustrative, and should not be construed as being limited in any way.

As shown in FIG. 5, the application servers 508 also can host other services, applications, portals, and/or other resources ("other resources") 524. The other resources 524 can include, but are not limited to, the drawing application 116. It thus can be appreciated that the computing environment 502 can provide integration of the concepts and technologies disclosed herein provided herein for touch interactions with a drawing application with various mailbox, messaging, social networking, and/or other services or resources. For example, the concepts and technologies disclosed herein can be used to share and collaborate on drawings using the drawing application 116.

As mentioned above, the computing environment 502 can include the data storage 510. According to various implementations, the functionality of the data storage 510 is provided by one or more databases operating on, or in communication with, the network 504. The functionality of the data storage 510 also can be provided by one or more server computers configured to host data for the computing environment 502. The data storage 510 can include, host, or provide one or more real or virtual datastores 526A-526N (hereinafter referred to collectively and/or generically as "datastores 526"). The datastores 526 are configured to host data used or created by the application servers 508 and/or other data. Although not illustrated in FIG. 5, the datastores 526 also can host or store the drawing application 116, the data 110, and/or the UIs 112.

The computing environment 502 can communicate with, or be accessed by, the network interfaces 512. The network interfaces 512 can include various types of network hardware and software for supporting communications between two or more computing devices including, but not limited to, the clients 506 and the application servers 508. It should be appreciated that the network interfaces 512 also may be utilized to connect to other types of networks and/or computer systems.

It should be understood that the distributed computing environment 500 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 500 provides the software functionality described herein as a service to the clients 506. It should be understood that the clients 506 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 500 to utilize the functionality described herein for touch interactions with a drawing application.

Figure 6:
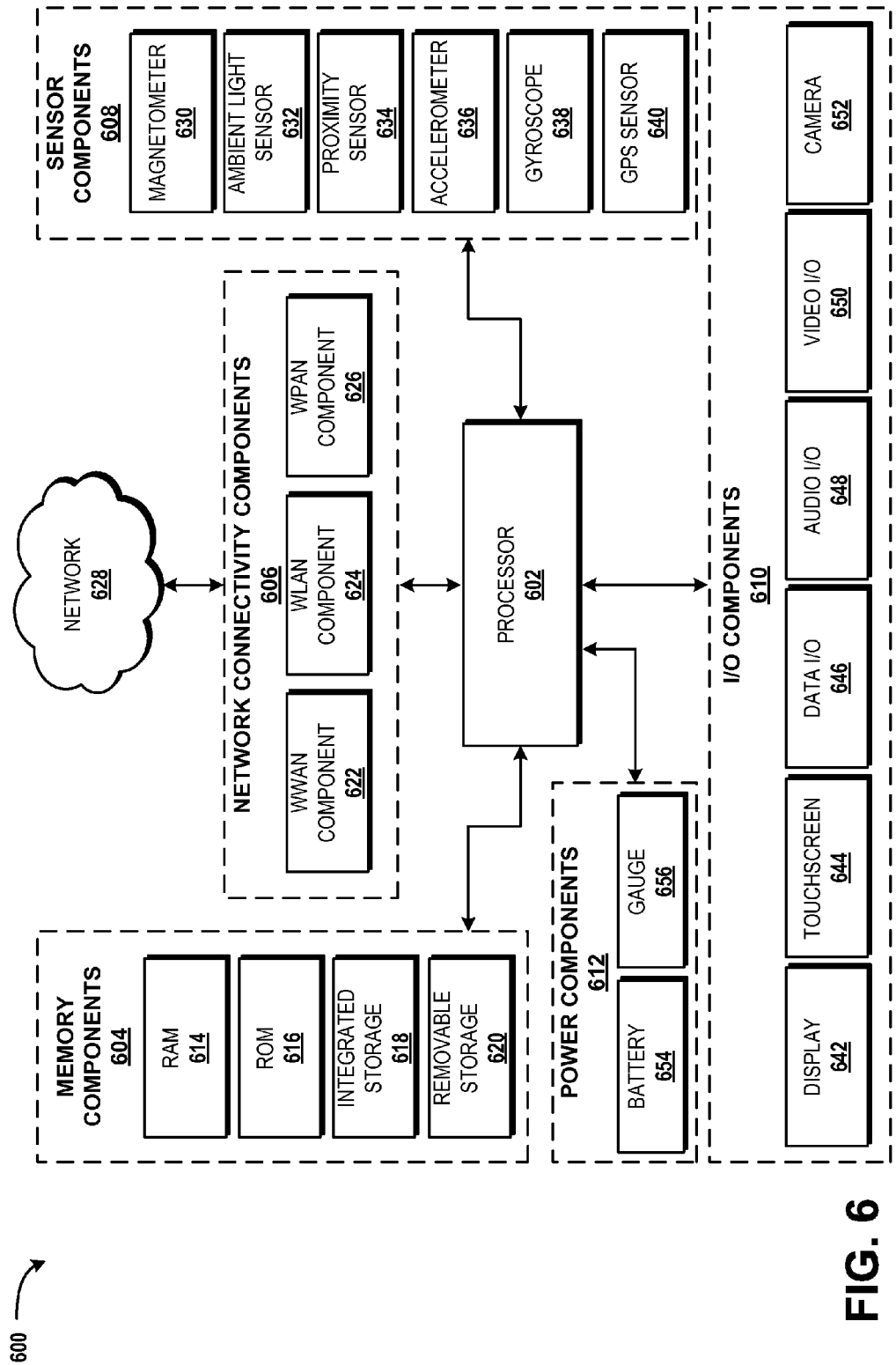
FIG. 6 is a computer architecture diagram illustrating a computing device architecture capable of implementing aspects of the embodiments presented herein.

Turning now to FIG. 6, an illustrative computing device architecture 600 for a computing device that is capable of executing various software components described herein for touch interactions with a drawing application. The computing device architecture 600 is applicable to computing devices that facilitate mobile computing due, in part, to form factor, wireless connectivity, and/or battery-powered operation. In some embodiments, the computing devices include, but are not limited to, mobile telephones, tablet devices, slate devices, portable video game devices, and the like. Moreover, the computing device architecture 600 is applicable to any of the clients 606 shown in FIG. 5. Furthermore, aspects of the computing device architecture 600 may be applicable to traditional desktop computers, portable computers (e.g., laptops, notebooks, ultra-portables, and netbooks), server computers, and other computer systems, such as described herein with reference to FIG. 4. For example, the single touch and multi-touch aspects disclosed herein below may be applied to desktop computers that utilize a touchscreen or some other touch-enabled device, such as a touch-enabled track pad or touch-enabled mouse.

The computing device architecture 600 illustrated in FIG. 6 includes a processor 602, memory components 604, network connectivity components 606, sensor components 608, input/output components 610, and power components 612. In the illustrated embodiment, the processor 602 is in communication with the memory components 604, the network connectivity components 606, the sensor components 608, the input/output ("I/O") components 610, and the power components 612. Although no connections are shown between the individuals components illustrated in FIG. 6, the components can interact to carry out device functions. In some embodiments, the components are arranged so as to communicate via one or more busses (not shown).

The processor 602 includes a central processing unit ("CPU") configured to process data, execute computer-executable instructions of one or more application programs, and communicate with other components of the computing device architecture 600 in order to perform various functionality described herein. The processor 602 may be utilized to execute aspects of the software components presented herein and, particularly, those that utilize, at least in part, a touch-enabled input.

In some embodiments, the processor 602 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720 p, 1080 p, and greater), video games, three-dimensional ("3D") modeling applications, and the like. In some embodiments, the processor 602 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some embodiments, the processor 602 is, or is included in, a system-on-chip ("SoC") along with one or more of the other components described herein below. For example, the SoC may include the processor 602, a GPU, one or more of the network connectivity components 606, and one or more of the sensor components 608. In some embodiments, the processor 602 is fabricated, in part, utilizing a package-on-package ("PoP") integrated circuit packaging technique. Moreover, the processor 602 may be a single core or multi-core processor.

The processor 602 may be created in accordance with an ARM architecture, available for license from ARM HOLDINGS of Cambridge, United Kingdom. Alternatively, the processor 602 may be created in accordance with an x86 architecture, such as is available from INTEL CORPORATION of Mountain View, Calif. and others. In some embodiments, the processor 602 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 604 include a random access memory ("RAM") 614, a read-only memory ("ROM") 616, an integrated storage memory ("integrated storage") 618, and a removable storage memory ("removable storage") 620. In some embodiments, the RAM 614 or a portion thereof, the ROM 616 or a portion thereof, and/or some combination the RAM 614 and the ROM 616 is integrated in the processor 602. In some embodiments, the ROM 616 is configured to store a firmware, an operating system or a portion thereof (e.g., operating system kernel), and/or a bootloader to load an operating system kernel from the integrated storage 618 or the removable storage 620.

The integrated storage 618 can include a solid-state memory, a hard disk, or a combination of solid-state memory and a hard disk. The integrated storage 618 may be soldered or otherwise connected to a logic board upon which the processor 602 and other components described herein also may be connected. As such, the integrated storage 618 is integrated in the computing device. The integrated storage 618 is configured to store an operating system or portions thereof, application programs, data, and other software components described herein.

The removable storage 620 can include a solid-state memory, a hard disk, or a combination of solid-state memory and a hard disk. In some embodiments, the removable storage 620 is provided in lieu of the integrated storage 618. In other embodiments, the removable storage 620 is provided as additional optional storage. In some embodiments, the removable storage 620 is logically combined with the integrated storage 618 such that the total available storage is made available and shown to a user as a total combined capacity of the integrated storage 618 and the removable storage 620.

The removable storage 620 is configured to be inserted into a removable storage memory slot (not shown) or other mechanism by which the removable storage 620 is inserted and secured to facilitate a connection over which the removable storage 620 can communicate with other components of the computing device, such as the processor 602. The removable storage 620 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 604 can store an operating system. According to various embodiments, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 606 include a wireless wide area network component ("WWAN component") 622, a wireless local area network component ("WLAN component") 624, and a wireless personal area network component ("WPAN component") 626. The network connectivity components 606 facilitate communications to and from a network 628, which may be a WWAN, a WLAN, or a WPAN. Although a single network 628 is illustrated, the network connectivity components 606 may facilitate simultaneous communication with multiple networks. For example, the network connectivity components 606 may facilitate simultaneous communications with multiple networks via one or more of a WWAN, a WLAN, or a WPAN.

In some embodiments, the functionality of the network 628 is provided by the networks 104 or 504. In some embodiments, the network 628 includes the networks 104 or 504. In other embodiments, the network 628 provides access to the networks 104 or 504.

The network 628 may be a WWAN, such as a mobile telecommunications network utilizing one or more mobile telecommunications technologies to provide voice and/or data services to a computing device utilizing the computing device architecture 600 via the WWAN component 622. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 628 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 628 may be configured to provide voice and/or data communications with any combination of the above technologies. The network 628 may be configured to or adapted to provide voice and/or data communications in accordance with future generation technologies.

In some embodiments, the WWAN component 622 is configured to provide dual-multi-mode connectivity to the network 628. For example, the WWAN component 622 may be configured to provide connectivity to the network 628, wherein the network 628 provides service via GSM and UMTS technologies, or via some other combination of technologies. Alternatively, multiple WWAN components 622 may be utilized to perform such functionality, and/or provide additional functionality to support other non-compatible technologies (i.e., incapable of being supported by a single WWAN component). The WWAN component 622 may facilitate similar connectivity to multiple networks (e.g., a UMTS network and an LTE network).

The network 628 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points are another computing device with connectivity to a WWAN that are functioning as a WI-FI hotspot. The WLAN component 624 is configured to connect to the network 628 via the WI-FI access points. Such connections may be secured via various encryption technologies including, but not limited, WI-FI Protected Access ("WPA"), WPA2, Wired Equivalent Privacy ("WEP"), and the like.

The network 628 may be a WPAN operating in accordance with Infrared Data Association ("IrDA"), BLUETOOTH, wireless Universal Serial Bus ("USB"), Z-Wave, ZIGBEE, or some other short-range wireless technology. In some embodiments, the WPAN component 626 is configured to facilitate communications with other devices, such as peripherals, computers, or other computing devices via the WPAN.

The sensor components 608 include a magnetometer 630, an ambient light sensor 632, a proximity sensor 634, an accelerometer 636, a gyroscope 638, and a Global Positioning System sensor ("GPS sensor") 640. It is contemplated that other sensors, such as, but not limited to, temperature sensors or shock detection sensors, also may be incorporated in the computing device architecture 600.

The magnetometer 630 is configured to measure the strength and direction of a magnetic field. In some embodiments the magnetometer 630 provides measurements to a compass application program stored within one of the memory components 604 in order to provide a user with accurate directions in a frame of reference including the cardinal directions, north, south, east, and west. Similar measurements may be provided to a navigation application program that includes a compass component. Other uses of measurements obtained by the magnetometer 630 are contemplated.

The ambient light sensor 632 is configured to measure ambient light. In some embodiments, the ambient light sensor 632 provides measurements to an application program stored within one the memory components 604 in order to automatically adjust the brightness of a display (described below) to compensate for low-light and high-light environments. Other uses of measurements obtained by the ambient light sensor 632 are contemplated.

The proximity sensor 634 is configured to detect the presence of an object or thing in proximity to the computing device without direct contact. In some embodiments, the proximity sensor 634 detects the presence of a user's body (e.g., the user's face) and provides this information to an application program stored within one of the memory components 604 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 634 are contemplated.

The accelerometer 636 is configured to measure proper acceleration. In some embodiments, output from the accelerometer 636 is used by an application program as an input mechanism to control some functionality of the application program. For example, the application program may be a video game in which a character, a portion thereof, or an object is moved or otherwise manipulated in response to input received via the accelerometer 636. In some embodiments, output from the accelerometer 636 is provided to an application program for use in switching between landscape and portrait modes, calculating coordinate acceleration, or detecting a fall. Other uses of the accelerometer 636 are contemplated.

The gyroscope 638 is configured to measure and maintain orientation. In some embodiments, output from the gyroscope 638 is used by an application program as an input mechanism to control some functionality of the application program. For example, the gyroscope 638 can be used for accurate recognition of movement within a 3D environment of a video game application or some other application. In some embodiments, an application program utilizes output from the gyroscope 638 and the accelerometer 636 to enhance control of some functionality of the application program. Other uses of the gyroscope 638 are contemplated.

The GPS sensor 640 is configured to receive signals from GPS satellites for use in calculating a location. The location calculated by the GPS sensor 640 may be used by any application program that requires or benefits from location information. For example, the location calculated by the GPS sensor 640 may be used with a navigation application program to provide directions from the location to a destination or directions from the destination to the location. Moreover, the GPS sensor 640 may be used to provide location information to an external location-based service, such as E911 service. The GPS sensor 640 may obtain location information generated via WI-FI, WIMAX, and/or cellular triangulation techniques utilizing one or more of the network connectivity components 606 to aid the GPS sensor 640 in obtaining a location fix. The GPS sensor 640 may also be used in Assisted GPS ("A-GPS") systems.

The I/O components 610 include a display 642, a touchscreen 644, a data I/O interface component ("data I/O") 646, an audio I/O interface component ("audio I/O") 648, a video I/O interface component ("video I/O") 650, and a camera 652. In some embodiments, the display 642 and the touchscreen 644 are combined. In some embodiments two or more of the data I/O component 646, the audio I/O component 648, and the video I/O component 650 are combined. The I/O components 610 may include discrete processors configured to support the various interface described below, or may include processing functionality built-in to the processor 602.

The display 642 is an output device configured to present information in a visual form. In particular, the display 642 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some embodiments, the display 642 is a liquid crystal display ("LCD") utilizing any active or passive matrix technology and any backlighting technology (if used). In some embodiments, the display 642 is an organic light emitting diode ("OLED") display. Other display types are contemplated.

The touchscreen 644 is an input device configured to detect the presence and location of a touch. The touchscreen 644 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen 644 is incorporated on top of the display 642 as a transparent layer to enable a user to use one or more touches to interact with objects or other information presented on the display 642. In other embodiments, the touchscreen 644 is a touch pad incorporated on a surface of the computing device that does not include the display 642. For example, the computing device may have a touchscreen incorporated on top of the display 642 and a touch pad on a surface opposite the display 642.

In some embodiments, the touchscreen 644 is a single-touch touchscreen. In other embodiments, the touchscreen 644 is a multi-touch touchscreen. In some embodiments, the touchscreen 644 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 644. As such, a developer may create gestures that are specific to a particular application program.

In some embodiments, the touchscreen 644 supports a tap gesture in which a user taps the touchscreen 644 once on an item presented on the display 642. The tap gesture may be used for various reasons including, but not limited to, opening or launching whatever the user taps. In some embodiments, the touchscreen 644 supports a double tap gesture in which a user taps the touchscreen 644 twice on an item presented on the display 642. The double tap gesture may be used for various reasons including, but not limited to, zooming in or zooming out in stages. In some embodiments, the touchscreen 644 supports a tap and hold gesture in which a user taps the touchscreen 644 and maintains contact for at least a predefined time. The tap and hold gesture may be used for various reasons including, but not limited to, opening a context-specific menu.

In some embodiments, the touchscreen 644 supports a pan gesture in which a user places a finger on the touchscreen 644 and maintains contact with the touchscreen 644 while moving the finger on the touchscreen 644. The pan gesture may be used for various reasons including, but not limited to, moving through screens, images, or menus at a controlled rate. Multiple finger pan gestures are also contemplated. In some embodiments, the touchscreen 644 supports a flick gesture in which a user swipes a finger in the direction the user wants the screen to move. The flick gesture may be used for various reasons including, but not limited to, scrolling horizontally or vertically through menus or pages. In some embodiments, the touchscreen 644 supports a pinch and stretch gesture in which a user makes a pinching motion with two fingers (e.g., thumb and forefinger) on the touchscreen 644 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 644. As such, the above gestures should be understood as being illustrative and should not be construed as being limiting in any way.

The data I/O interface component 646 is configured to facilitate input of data to the computing device and output of data from the computing device. In some embodiments, the data I/O interface component 646 includes a connector configured to provide wired connectivity between the computing device and a computer system, for example, for synchronization operation purposes. The connector may be a proprietary connector or a standardized connector such as USB, micro-USB, mini-USB, or the like. In some embodiments, the connector is a dock connector for docking the computing device with another device such as a docking station, audio device (e.g., a digital music player), or video device.

The audio I/O interface component 648 is configured to provide audio input and/or output capabilities to the computing device. In some embodiments, the audio I/O interface component 646 includes a microphone configured to collect audio signals. In some embodiments, the audio I/O interface component 646 includes a headphone jack configured to provide connectivity for headphones or other external speakers. In some embodiments, the audio interface component 648 includes a speaker for the output of audio signals. In some embodiments, the audio I/O interface component 646 includes an optical audio cable out.

The video I/O interface component 650 is configured to provide video input and/or output capabilities to the computing device. In some embodiments, the video I/O interface component 650 includes a video connector configured to receive video as input from another device (e.g., a video media player such as a DVD or BLURAY player) or send video as output to another device (e.g., a monitor, a television, or some other external display). In some embodiments, the video I/O interface component 650 includes a High-Definition Multimedia Interface ("HDMI"), mini-HDMI, micro-HDMI, DisplayPort, or proprietary connector to input/output video content. In some embodiments, the video I/O interface component 650 or portions thereof is combined with the audio I/O interface component 648 or portions thereof.

The camera 652 can be configured to capture still images and/or video. The camera 652 may utilize a charge coupled device ("CCD") or a complementary metal oxide semiconductor ("CMOS") image sensor to capture images. In some embodiments, the camera 652 includes a flash to aid in taking pictures in low-light environments. Settings for the camera 652 may be implemented as hardware or software buttons.

Although not illustrated, one or more hardware buttons may also be included in the computing device architecture 600. The hardware buttons may be used for controlling some operational aspect of the computing device. The hardware buttons may be dedicated buttons or multi-use buttons. The hardware buttons may be mechanical or sensor-based.

The illustrated power components 612 include one or more batteries 654, which can be connected to a battery gauge 656. The batteries 654 may be rechargeable or disposable. Rechargeable battery types include, but are not limited to, lithium polymer, lithium ion, nickel cadmium, and nickel metal hydride. Each of the batteries 654 may be made of one or more cells.

The battery gauge 656 can be configured to measure battery parameters such as current, voltage, and temperature. In some embodiments, the battery gauge 656 is configured to measure the effect of a battery's discharge rate, temperature, age and other factors to predict remaining life within a certain percentage of error. In some embodiments, the battery gauge 656 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 612 may also include a power connector, which may be combined with one or more of the aforementioned I/O components 610. The power components 612 may interface with an external power system or charging equipment via a power I/O component 644.

Based on the foregoing, it should be appreciated that technologies for touch interactions with a drawing application have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:
1. A computer-implemented method for interacting with an application, the computer-implemented method comprising performing computer-implemented operations for:
    displaying, in a user interface on a display device associated with a computer, data generated by the application;
    detecting, at the computer, a touch gesture at the user interface;
    determining whether the touch gesture intersects an object displayed in the user interface;
    determining whether the touch gesture has been released;

in response to determining the touch gesture intersects the object, and while the touch gesture has not been released, determining whether a second touch has been detected;
    in response to determining the second touch has been detected, displaying auto-connect options;
    determining whether a third touch has been detected while the touch gesture has not been released;
    in response to determining the third touch has been detected while the touch gesture has not been released, displaying options for modifying or interacting with the intersected object
    determining if a fourth touch has been detected while the touch gesture has not been released; and
    in response to determining the fourth touch has been detected while the touch gesture has not been released, displaying a user interface object that allows text associated with the intersected object to be entered.

2. The method of claim 1, further comprising:
in response to determining that the touch gesture intersects the object and has been released, determining if the intersected object was selected when the touch gesture was detected; and
in response to determining the intersected object was not selected, selecting the intersected object.

3. The method of claim 1, further comprising:
determining whether a subsequent touch corresponds to a touch-right-click gesture; and
displaying a contextual user interface, in response to determining that the subsequent touch corresponds to the touch-right-click gesture.

4. The method of claim 1, further comprising:
in response to determining that the touch gesture intersects the object and has been released, determining if the intersected object was selected when the touch gesture was detected; and
if the intersected object was selected, determining if the touch gesture included movement and if so, invoking a move command to move the object.

5. The method of claim 1, further comprising:
in response to determining that the touch gesture does not intersect the object, determining if a subsequent touch has been detected at the user interface during a contact associated with the touch gesture;
if the subsequent touch has been detected at the user interface, determining if the contact associated with the touch gesture is detected at a shapes toolbar displayed in the user interface; and
if the contact associated with the touch gesture is detected at the shapes toolbar, creating, within a workspace at a location associated with the subsequent touch, a new object intersected by the touch gesture at the shapes toolbar.

6. An apparatus
comprising: one or more processors;
a touch-sensitive display configured to display a user interface; and
a computer storage medium having computer-readable instructions stored thereon that, when executed on the one or more processors, cause the apparatus to
    display data generated by a web-based application executed by a server computer,
    detect a touch gesture on the touch-sensitive display,
    determine whether the touch gesture intersects an object displayed in the user interface,
    determine whether the touch gesture has been released,
    in response to determining the touch gesture intersects the object, and while the touch gesture has not been released, determine whether a second touch has been detected,
    in response to determining the second touch has been detected, display auto-connect options,
    determine whether a third touch has been detected while the touch gesture has not been released,
    in response to determining the third touch has been detected while the touch gesture has not been released, display options for modifying or interacting with the intersected object,
    determine if a fourth touch has been detected while the touch gesture has not been released, and
    in response to determining the fourth touch has been detected while the touch gesture has not been released, display a user interface object that allows text associated with the intersected object to be entered.

7. The apparatus of claim 6, wherein determining if the touch gesture intersects the object comprises determining if a contact point associated with the touch gesture overlaps at least a portion of the touch-sensitive display that displays the intersected object.

8. The apparatus of claim 6, further comprising computer-readable instructions that, when executed on the one or more processors, cause the apparatus to:
determine that the touch gesture is made with two fingers;
track a movement associated with the touch gesture to determine a direction and a magnitude associated with the movement; and
pan a workspace displayed within the user interface based upon the direction and the magnitude, without regard to whether the touch gesture intersects the object.

9. The apparatus of claim 6, further comprising computer-readable instructions that, when executed on the one or more processors, cause the apparatus to:
if the touch gesture intersects the object and has been released,
determine if the intersected object was selected when the touch gesture was detected;
if the intersected object was not selected when the touch gesture was detected, select the intersected object; and
if the intersected object was selected when the touch gesture was detected, launch a text edit mode, in response to determining that the touch gesture
was not moved, and
    invoke a move command, in response to determining that the touch gesture was moved.

10. The apparatus of claim 6, further comprising computer-readable instructions that, when executed on the one or more processors, cause the apparatus to:
determine whether the intersected object was selected when the touch gesture was detected;
in response to determining that the touch gesture intersects the object and that the intersected object was selected when the touch gesture was detected, determine a movement associated with the touch gesture; and
invoke a move command to move the intersected object based upon the movement.

11. The apparatus of claim 6, further comprising computer readable instructions that, when executed by the computer, cause the computer to:
determine if the touch gesture is detected at a shapes toolbar displayed in the user interface;
if the touch gesture is detected at the shapes toolbar, create, centered within a workspace displayed in the user interface, a shape depicted at a contact point in the shapes toolbar intersected by the touch gesture; and if a subsequent touch is detected prior to release of the touch gesture, create, centered at the subsequent touch, another shape depicted at the contact point.

12. A computer storage medium having computer-readable instructions stored thereon that, when executed by a computer, cause the computer to:

display, in a user interface presented at the computer, a drawing, wherein the computer presents the drawing by rendering markup language data generated by a web-based application executed by a server computer;

detect, at the computer, a touch gesture at a touch-sensitive display device used to display the user interface;

determine whether the touch gesture intersects an object included in the drawing;

determine whether the touch gesture has been released;

in response to determining the touch gesture intersects the object, and while the touch gesture has not been released, determine whether a second touch has been detected;

in response to determining the second touch has been detected, display auto-connect options;

determine whether a third touch has been detected while the touch gesture has not been released;

in response to determining the third touch has been detected while the touch gesture has not been released, display options for modifying or interacting with the intersected object;

determine if a fourth touch has been detected while the touch gesture has not been released; and in response to determining the fourth touch has been detected while the touch gesture has not been released, display a user interface object that allows text associated with the intersected object to be entered.

13. The computer storage medium of claim 12, further comprising computer-readable instructions that, when executed by the computer, cause the computer to:

determine if the touch gesture is detected at a shapes toolbar displayed in the user interface;

if the touch gesture is detected at the shapes toolbar, create, centered within a workspace displayed in the user interface, a shape depicted at a contact point in the shapes toolbar intersected by the touch gesture; and if a subsequent touch is detected prior to release of the touch gesture, create, centered at the subsequent touch, another shape depicted at the contact point.

14. The method of claim 1, further comprising detecting a touch outside of the user interface object that allows text associated with the intersected object to be entered, and in response to detecting the touch outside of the user interface object, returning the intersected object to a basic selected state.

15. The computer storage medium of claim 12, further comprising computer-readable instructions that, when executed by the computer, cause the computer to:

in response to determining that the touch gesture intersects the object and has been released, determine whether the intersected object was selected when the touch gesture was detected; and in response to determining the intersected object was not selected, select the intersected object.

16. The computer storage medium of claim 12, further comprising computer-readable instructions that, when executed by the computer, cause the computer to:

determine whether a subsequent touch corresponds to a touch-right-click gesture; and display a contextual user interface, in response to determining that the subsequent touch corresponds to the touch-right-click gesture.

17. The computer storage medium of claim 12, further comprising computer-readable instructions that, when executed by the computer, cause the computer to:

in response to determining that the touch gesture intersects the object and has been released, determine whether the intersected object was selected when the touch gesture was detected; and if the intersected object was selected, determine whether the touch gesture included movement and if so, invoke a move command to move the object.

18. The computer storage medium of claim 12, further comprising computer-readable instructions that, when executed by the computer, cause the computer to:

in response to determining that the touch gesture does not intersect the object, determining whether a subsequent touch has been detected at the user interface during a contact associated with the touch gesture;

if the subsequent touch has been detected at the user interface during a contact associated with the touch gesture, determining whether the contact associated with the touch gesture is detected at a shapes toolbar displayed in the user interface; and if the contact associated with the touch gesture is detected at the shapes toolbar, creating, within a workspace at a location associated with the subsequent touch, a new object intersected by the touch gesture at the shapes toolbar.

* * * * *